(12) United States Patent
Fetzer et al.

(10) Patent No.: US 11,280,760 B2
(45) Date of Patent: Mar. 22, 2022

(54) APPARATUS AND METHOD FOR MODULATED-FREQUENCY ULTRASONIC INSPECTION OF STRUCTURES

(71) Applicant: The Boeing Company, Chicago, IL (US)

(72) Inventors: Barry A. Fetzer, Renton, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 231 days.

(21) Appl. No.: 16/591,216

(22) Filed: Oct. 2, 2019

(65) Prior Publication Data
US 2021/0102920 A1 Apr. 8, 2021

(51) Int. Cl.
| | |
|---|---|
| *G01N 29/12* | (2006.01) |
| *G01N 29/22* | (2006.01) |
| *G01N 29/265* | (2006.01) |
| *G01N 29/04* | (2006.01) |

(52) U.S. Cl.
CPC .......... *G01N 29/041* (2013.01); *G01N 29/12* (2013.01); *G01N 29/221* (2013.01); *G01N 29/265* (2013.01); *G01N 2291/0234* (2013.01); *G01N 2291/263* (2013.01)

(58) Field of Classification Search
CPC .... G01N 29/041; G01N 29/348; G01N 29/12; G01N 29/2437; G01N 29/043; G01N 29/265; G01N 29/221; G01N 2291/263; G01N 2291/0234
USPC .......................................................... 73/627
See application file for complete search history.

(56) References Cited

U.S. PATENT DOCUMENTS

| | | | | |
|---|---|---|---|---|
| 7,678,054 B2* | 3/2010 | Okazaki | ................. | G10K 11/32 600/459 |
| 7,694,567 B2* | 4/2010 | Haupt | ................ | G01N 29/0618 73/627 |
| 8,811,119 B2* | 8/2014 | Aarts | ...................... | H04S 7/301 367/92 |
| 2005/0277835 A1* | 12/2005 | Angelsen | ............... | A61B 8/485 600/437 |
| 2006/0225509 A1* | 10/2006 | Haupt | .................. | G01N 29/348 73/649 |
| 2013/0064042 A1* | 3/2013 | Aarts | ...................... | H04R 3/12 367/99 |

OTHER PUBLICATIONS

Directional sound, Wikipedia, https://en.wikipedia.org/wiki/Directional_sound, accessed Jul. 3, 2019.

* cited by examiner

*Primary Examiner* — Jacques M Saint Surin
(74) *Attorney, Agent, or Firm* — Kunzler Bean & Adamson

(57) ABSTRACT

Disclosed herein is a non-destructive inspection (NDI) apparatus. The NDI comprises a main body and a modulated-frequency ultrasonic source, coupled to the main body. The modulated-frequency ultrasonic source comprises a low-frequency ultrasonic source, selectively operable to emit a low-frequency ultrasonic beam having a first frequency. The modulated-frequency ultrasonic source also comprises a high-frequency ultrasonic source, selectively operable to emit a high-frequency ultrasonic beam having a second frequency higher than the first frequency. The modulated-frequency ultrasonic source is configured to mix the low-frequency ultrasonic beam and the high-frequency ultrasonic beam at least at a surface of a structure to be inspected.

25 Claims, 15 Drawing Sheets

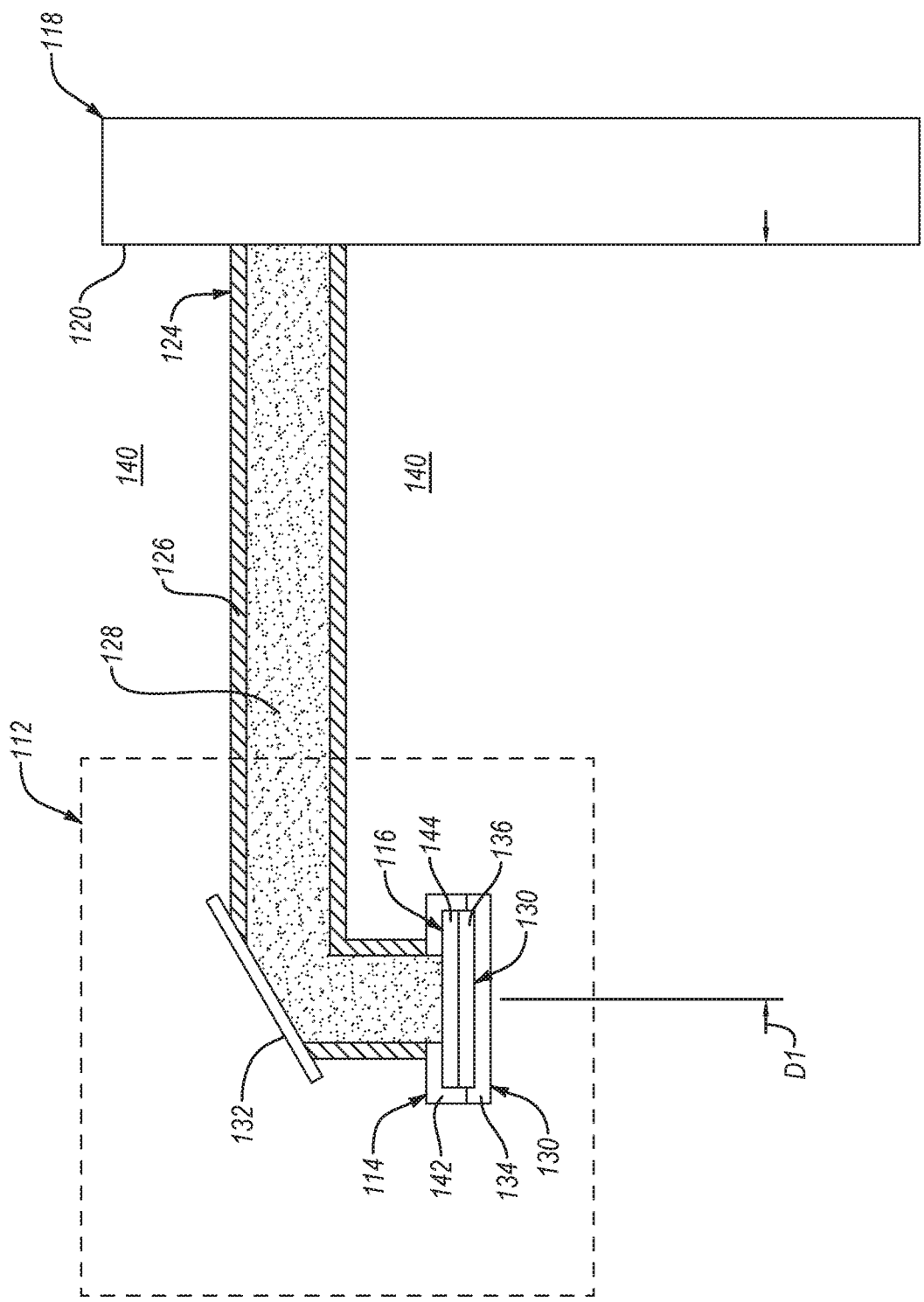

APPARATUS AND METHOD FOR MODULATED-FREQUENCY ULTRASONIC INSPECTION OF STRUCTURES

FIELD

This disclosure relates generally to non-destructive inspection of structures, and more particularly to inspecting structures using ultrasonic inspection techniques.

BACKGROUND

Non-destructive inspection systems utilize ultrasonic beams to inspect structures for anomalies. Ultrasonic beams with low frequencies are capable of penetrating deeper into structures than ultrasonic beams with comparatively higher frequencies. In contrast, ultrasonic beams with high frequencies are capable of providing higher resolution of anomalies in structures than ultrasonic beams with comparatively lower frequencies. There is a need for a non-destructive inspection apparatus and method that utilizes both the ability of low-frequency ultrasonic beams to penetrate deeper into structures and the ability of high-frequency ultrasonic beams to provide higher resolution of anomalies in structures.

SUMMARY

The subject matter of the present application provides examples of an apparatus and a method for non-destructively inspecting structures using ultrasonic beams that overcome the above-discussed shortcomings of prior art techniques. Accordingly, the subject matter of the present application has been developed in response to the present state of the art, and in particular, in response to shortcomings of conventional systems and techniques for ultrasonically inspecting structures for anomalies.

Disclosed herein is a non-destructive inspection (NDI) apparatus. The NDI comprises a main body and a modulated-frequency ultrasonic source, coupled to the main body. The modulated-frequency ultrasonic source comprises a low-frequency ultrasonic source, selectively operable to emit a low-frequency ultrasonic beam having a first frequency. The modulated-frequency ultrasonic source also comprises a high-frequency ultrasonic source, selectively operable to emit a high-frequency ultrasonic beam having a second frequency higher than the first frequency. The modulated-frequency ultrasonic source is configured to mix the low-frequency ultrasonic beam and the high-frequency ultrasonic beam at least at a surface of a structure to be inspected. The preceding subject matter of this paragraph characterizes example 1 of the present disclosure.

Each one of the low-frequency ultrasonic source and the high-frequency ultrasonic source comprises a piezoelectric material. The preceding subject matter of this paragraph characterizes example 2 of the present disclosure, wherein example 2 also includes the subject matter according to example 1, above.

The modulated-frequency ultrasonic source further comprises at least one ultrasonically reflective surface, positioned relative to one of the low-frequency ultrasonic source or the high-frequency ultrasonic source, to receive and redirect one of the low-frequency ultrasonic beam or the high-frequency ultrasonic beam to mix with another one of the low-frequency ultrasonic beam or the high-frequency ultrasonic beam at least at the surface of the structure to be inspected. The preceding subject matter of this paragraph characterizes example 3 of the present disclosure, wherein example 3 also includes the subject matter according to any one of examples 1-2, above.

The modulated-frequency ultrasonic source further comprises a plurality of ultrasonically reflective surfaces. A first one of the plurality of ultrasonically reflective surfaces is positioned relative to the low-frequency ultrasonic source to receive and redirect the low-frequency ultrasonic beam to mix with the high-frequency ultrasonic beam. A second one of the plurality of ultrasonically reflective surfaces is positioned relative to the high-frequency ultrasonic source to receive and redirect the high-frequency ultrasonic beam to mix with the low-frequency ultrasonic beam. The preceding subject matter of this paragraph characterizes example 4 of the present disclosure, wherein example 4 also includes the subject matter according to example 3, above.

The modulated-frequency ultrasonic source further comprises a vibration damper interposed between the low-frequency ultrasonic source and the high-frequency ultrasonic source. The low-frequency ultrasonic source and the high-frequency ultrasonic source are arranged in a back-to-back configuration such that the low-frequency ultrasonic source emits the low-frequency ultrasonic beam in a first direction and the high-frequency ultrasonic source emits the high-frequency ultrasonic beam in a second direction opposite the first direction. The preceding subject matter of this paragraph characterizes example 5 of the present disclosure, wherein example 5 also includes the subject matter according to example 4, above.

The vibration damper comprises a first damping material and a second damping material. The first damping material is interposed between the low-frequency ultrasonic source and the second damping material. The second damping material is interposed between the first damping material and the high-frequency ultrasonic source. A damping coefficient of the first damping material is lower than a damping coefficient of the second damping material. The preceding subject matter of this paragraph characterizes example 6 of the present disclosure, wherein example 6 also includes the subject matter according to example 5, above.

The low-frequency ultrasonic source and the high-frequency ultrasonic source are arranged in a side-by-side configuration such that the low-frequency ultrasonic source emits the low-frequency ultrasonic beam at a first distance away from the surface of the structure and the high-frequency ultrasonic source emits the high-frequency ultrasonic beam at the first distance away from the surface of the structure. The preceding subject matter of this paragraph characterizes example 7 of the present disclosure, wherein example 7 also includes the subject matter according to example 3, above.

The at least one ultrasonically reflective surface receives and redirects both the low-frequency ultrasonic beam and the high-frequency ultrasonic beam to mix the low-frequency ultrasonic beam and the high-frequency ultrasonic beam. The low-frequency ultrasonic source emits the low-frequency ultrasonic beam in a first direction. The high-frequency ultrasonic source emits the high-frequency ultrasonic beam in a second direction different than the first direction. The preceding subject matter of this paragraph characterizes example 8 of the present disclosure, wherein example 8 also includes the subject matter according to example 7, above.

The modulated-frequency ultrasonic source further comprises a plurality of ultrasonically reflective surfaces. A first one of the plurality of ultrasonically reflective surfaces receives and redirects the low-frequency ultrasonic beam to mix with the high-frequency ultrasonic beam. A second one of the plurality of ultrasonically reflective surfaces receives and redirects the high-frequency ultrasonic beam to mix with the low-frequency ultrasonic beam. The low-frequency ultrasonic source emits the low-frequency ultrasonic beam in a first direction. The high-frequency ultrasonic source emits the high-frequency ultrasonic beam in the first direction. The first one of the plurality of ultrasonically reflective surfaces is angled relative to the second one of the plurality of ultrasonically reflective surfaces. The preceding subject matter of this paragraph characterizes example 9 of the present disclosure, wherein example 9 also includes the subject matter according to example 7, above.

The modulated-frequency ultrasonic source further comprises a plurality of ultrasonically reflective surfaces. The low-frequency ultrasonic source emits the low-frequency ultrasonic beam in a first direction and emits a second low-frequency ultrasonic beam in a second direction opposite the first direction. The high-frequency ultrasonic source emits the high-frequency ultrasonic beam in the first direction and emits a second high-frequency ultrasonic beam in the second direction. A first one of the plurality of ultrasonically reflective surfaces receives and redirects both the low-frequency ultrasonic beam and the high-frequency ultrasonic beam to mix the low-frequency ultrasonic beam, the high-frequency ultrasonic beam, the second low-frequency ultrasonic beam, and the second high-frequency ultrasonic beam at least at the surface of the structure to be inspected. A second one of the plurality of ultrasonically reflective surfaces receives and redirects both the second low-frequency ultrasonic beam and the second high-frequency ultrasonic beam to mix the second low-frequency ultrasonic beam, the second high-frequency ultrasonic beam, the low-frequency ultrasonic beam, and the high-frequency ultrasonic beam at least at the surface of the structure to be inspected. The preceding subject matter of this paragraph characterizes example 10 of the present disclosure, wherein example 10 also includes the subject matter according to example 7, above.

The low-frequency ultrasonic source and the high-frequency ultrasonic source are arranged in a front-to-back configuration such that the low-frequency ultrasonic source emits the low-frequency ultrasonic beam at a first distance away from the surface of the structure and the high-frequency ultrasonic source emits the high-frequency ultrasonic beam at a second distance away from the surface of the structure. The first distance is greater than the second distance. The preceding subject matter of this paragraph characterizes example 11 of the present disclosure, wherein example 11 also includes the subject matter according to example 3, above.

The modulated-frequency ultrasonic source further comprises a plurality of ultrasonically reflective surfaces. A first one of the plurality of ultrasonically reflective surfaces receives and redirects the low-frequency ultrasonic beam to mix the low-frequency ultrasonic beam and the high-frequency ultrasonic beam. A second one of the plurality of ultrasonically reflective surfaces receives and redirects the high-frequency ultrasonic beam to mix the high-frequency ultrasonic beam and the low-frequency ultrasonic beam. The low-frequency ultrasonic source emits the low-frequency ultrasonic beam in a first direction. The high-frequency ultrasonic source emits the high-frequency ultrasonic beam in a second direction opposite the first direction. The preceding subject matter of this paragraph characterizes example 12 of the present disclosure, wherein example 12 also includes the subject matter according to example 11, above.

The modulated-frequency ultrasonic source further comprises a plurality of ultrasonically reflective surfaces. The low-frequency ultrasonic source emits the low-frequency ultrasonic beam in a first direction and emits a second low-frequency ultrasonic beam in a second direction opposite the first direction. The high-frequency ultrasonic source emits the high-frequency ultrasonic beam in the first direction and emits a second high-frequency ultrasonic beam in the second direction. A first one of the plurality of ultrasonically reflective surfaces receives and redirects the low-frequency ultrasonic beam to mix the low-frequency ultrasonic beam, the high-frequency ultrasonic beam, the second low-frequency ultrasonic beam, and the second high-frequency ultrasonic beam at least at the surface of the structure to be inspected. A second one of the plurality of ultrasonically reflective surfaces receives and redirects the second low-frequency ultrasonic beam to mix the second low-frequency ultrasonic beam, the high-frequency ultrasonic beam, the low-frequency ultrasonic beam, and the second high-frequency ultrasonic beam at least at the surface of the structure to be inspected. A third one of the plurality of ultrasonically reflective surfaces receives and redirects the high-frequency ultrasonic beam to mix the high-frequency ultrasonic beam, the low-frequency ultrasonic beam, the second low-frequency ultrasonic beam, and the second high-frequency ultrasonic beam at least at the surface of the structure to be inspected. A fourth one of the plurality of ultrasonically reflective surfaces receives and redirects the second high-frequency ultrasonic beam to mix the second high-frequency ultrasonic beam, the low-frequency ultrasonic beam, the second low-frequency ultrasonic beam, and the second high-frequency ultrasonic beam at least at the surface of the structure to be inspected. The preceding subject matter of this paragraph characterizes example 13 of the present disclosure, wherein example 13 also includes the subject matter according to example 11, above.

The high-frequency ultrasonic source is positioned to receive the low-frequency ultrasonic beam. The low-frequency ultrasonic beam induces the high-frequency ultrasonic source to emit the high-frequency ultrasonic beam. The preceding subject matter of this paragraph characterizes example 14 of the present disclosure, wherein example 14 also includes the subject matter according to example 11, above.

The modulated-frequency ultrasonic source further comprises a vibration damper coupled to the high-frequency ultrasonic source and interposed between the high-frequency ultrasonic source and the low-frequency ultrasonic source. The high-frequency ultrasonic source is positioned to be within the low-frequency ultrasonic beam. The preceding subject matter of this paragraph characterizes example 15 of the present disclosure, wherein example 15 also includes the subject matter according to example 11, above.

The modulated-frequency ultrasonic source further comprises a vibration damper, a plurality of ultrasonically reflective surfaces, a plurality of low-frequency ultrasonic sources, and a plurality of high-frequency ultrasonic sources. A first one of the plurality of low-frequency ultrasonic sources is selectively operable to emit the low-frequency ultrasonic beam in a first direction. A second one of the plurality of low-frequency ultrasonic sources is selectively operable to emit a second low-frequency ultrasonic beam in a second direction different than the first direction.

A first one of the plurality of high-frequency ultrasonic sources is selectively operable to emit the high-frequency ultrasonic beam in a third direction different than the first direction and the second direction. A second one of the plurality of high-frequency ultrasonic sources is selectively operable to emit a second high-frequency ultrasonic beam in a fourth direction different than the first direction, the second direction, and the third direction. The vibration damper is interposed between the first one and the second one of the plurality of low-frequency ultrasonic sources and interposed between the first one and the second one of the plurality of high-frequency ultrasonic sources. Each one of the plurality of ultrasonically reflective surfaces is positioned to receive and redirect a corresponding one of the low-frequency ultrasonic beam, the second low-frequency ultrasonic beam, the high-frequency ultrasonic beam, and the second high-frequency ultrasonic beam to mix the low-frequency ultrasonic beam, the second low-frequency ultrasonic beam, the high-frequency ultrasonic beam, and the second high-frequency ultrasonic beam at least at the surface of the structure to be inspected. The preceding subject matter of this paragraph characterizes example 16 of the present disclosure, wherein example 16 also includes the subject matter according to any one of examples 1-2, above.

The first direction is opposite the second direction. The third direction is opposite the fourth direction. The first direction is perpendicular to the third direction. The preceding subject matter of this paragraph characterizes example 17 of the present disclosure, wherein example 17 also includes the subject matter according to example 16, above.

The modulated-frequency ultrasonic source further comprises a vibration damper, a plurality of ultrasonically reflective surfaces, and a plurality of high-frequency ultrasonic sources. The low-frequency ultrasonic source is selectively operable to emit the low-frequency ultrasonic beam in a first direction. A first one of the plurality of high-frequency ultrasonic sources is selectively operable to emit the high-frequency ultrasonic beam in a second direction different than the first direction. A second one of the plurality of high-frequency ultrasonic sources is selectively operable to emit a second high-frequency ultrasonic beam in a third direction different than the first direction and the second direction. A third one of the plurality of high-frequency ultrasonic sources is selectively operable to emit a third high-frequency ultrasonic beam in a fourth direction different than the first direction, the second direction, and the third direction. The vibration damper is interposed between the low-frequency ultrasonic source and the first one of the plurality of high-frequency ultrasonic sources and interposed between the second one and the third one of the plurality of high-frequency ultrasonic sources. Each one of the plurality of ultrasonically reflective surfaces is positioned to receive and redirect a corresponding one of the low-frequency ultrasonic beam, the high-frequency ultrasonic beam, the second high-frequency ultrasonic beam, and the third high-frequency ultrasonic beam to mix the low-frequency ultrasonic beam, the high-frequency ultrasonic beam, the second high-frequency ultrasonic beam, and the third high-frequency ultrasonic beam at least at the surface of the structure to be inspected. The modulated-frequency ultrasonic source has more high-frequency ultrasonic sources than low-frequency ultrasonic sources. The preceding subject matter of this paragraph characterizes example 18 of the present disclosure, wherein example 18 also includes the subject matter according to any one of examples 1-2, above.

The modulated-frequency ultrasonic source further comprises a first vibration damper coupled to the low-frequency ultrasonic source. The modulated-frequency ultrasonic source also comprises an ultrasonically reflective coating applied to the low-frequency ultrasonic source such that the low-frequency ultrasonic source is interposed between the first vibration damper and the ultrasonically reflective coating. The modulated-frequency ultrasonic source additionally comprises a second vibration damper coupled to the high-frequency ultrasonic source. The high-frequency ultrasonic source is arranged, relative to the low-frequency ultrasonic source, to emit the high-frequency ultrasonic beam toward the low-frequency ultrasonic source such that the high-frequency ultrasonic beam induces the low-frequency ultrasonic source to emit the low-frequency ultrasonic beam. The preceding subject matter of this paragraph characterizes example 19 of the present disclosure, wherein example 19 also includes the subject matter according to any one of examples 1-2, above.

The NDI apparatus further comprises an ultrasonic receiver system comprising at least one ultrasonic receiver tuned to detect ultrasonic waves reflected from the structure and having the second frequency. The preceding subject matter of this paragraph characterizes example 20 of the present disclosure, wherein example 20 also includes the subject matter according to any one of examples 1-19, above.

Also disclosed herein is an NDI apparatus that comprises a main body and a modulated-frequency ultrasonic source that is coupled to the main body. The modulated-frequency ultrasonic source comprises a low-frequency ultrasonic source, selectively operable to emit a low-frequency ultrasonic beam having a first frequency and a high-frequency ultrasonic source, selectively operable to emit a high-frequency ultrasonic beam having a second frequency higher than the first frequency. The modulated-frequency ultrasonic source additionally comprises at least two ultrasonically reflective surfaces, each positioned relative to a corresponding one of the low-frequency ultrasonic source and the high-frequency ultrasonic source, to receive and redirect a corresponding one of the low-frequency ultrasonic beam and the high-frequency ultrasonic beam to mix with the other one of the low-frequency ultrasonic beam and the high-frequency ultrasonic beam at least at the surface of the structure to be inspected. The preceding subject matter of this paragraph characterizes example 21 of the present disclosure.

Additionally disclosed herein is a method of inspecting a structure. The method comprises emitting a low-frequency ultrasonic beam, having a first frequency, from a low-frequency ultrasonic source. The method further comprises emitting a high-frequency ultrasonic beam, having a second frequency higher than the first frequency, from a high-frequency ultrasonic source. The method also comprises mixing the low-frequency ultrasonic beam and the high-frequency ultrasonic beam at least at a surface of the structure to be inspected. The preceding subject matter of this paragraph characterizes example 22 of the present disclosure.

The method further comprises receiving, at at least one ultrasonically reflective surface, and redirecting, from the at least one ultrasonically reflective surface, one of the low-frequency ultrasonic beam or the high-frequency ultrasonic beam to mix with the other one of the low-frequency ultrasonic beam or the high-frequency ultrasonic beam at least at the surface of the structure to be inspected. The preceding subject matter of this paragraph characterizes example 23 of the present disclosure, wherein example 23 also includes the subject matter according to example 22, above.

The method additionally comprises receiving, at a first ultrasonically reflective surface, and redirecting, from the first ultrasonically reflective surface, the low-frequency ultrasonic beam to mix with the high-frequency ultrasonic beam at least at the surface of the structure to be inspected. The method also comprises receiving, at a second ultrasonically reflective surface, and redirecting, from the second ultrasonically reflective surface, the high-frequency ultrasonic beam to mix with the low-frequency ultrasonic beam at least at the surface of the structure to be inspected. The preceding subject matter of this paragraph characterizes example 24 of the present disclosure, wherein example 24 also includes the subject matter according to any one of examples 22-23, above.

The method further comprises detecting, using at least one ultrasonic receiver, ultrasonic waves that have the second frequency and are reflected from the structure. The preceding subject matter of this paragraph characterizes example 25 of the present disclosure, wherein example 25 also includes the subject matter according to any one of examples 22-24, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which:

FIG. 3A is a side view of the NDI apparatus of FIG. 1, according to one or more examples of the present disclosure;

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is a non-destructive inspection (NDI) apparatus that utilizes ultrasonic transmissions to inspect and detect anomalies in structures. The NDI apparatus is configured to introduce a modulated ultrasonic beam at the surface of the structure to be inspected. The modulated ultrasonic beam includes a low-frequency ultrasonic beam component and a high-frequency ultrasonic beam component. The low-frequency ultrasonic beam component helps the high-frequency ultrasonic beam component to transmit through a transmission medium, before reaching the structure, and to penetrate the structure. Accordingly, the modulated ultrasonic beam of the NDI apparatus facilitates the capture of high-resolution detection of anomalies within structures at depths that otherwise would not be obtainable without the low-frequency ultrasonic beam component of the modulated ultrasonic beam.

Figure 1:
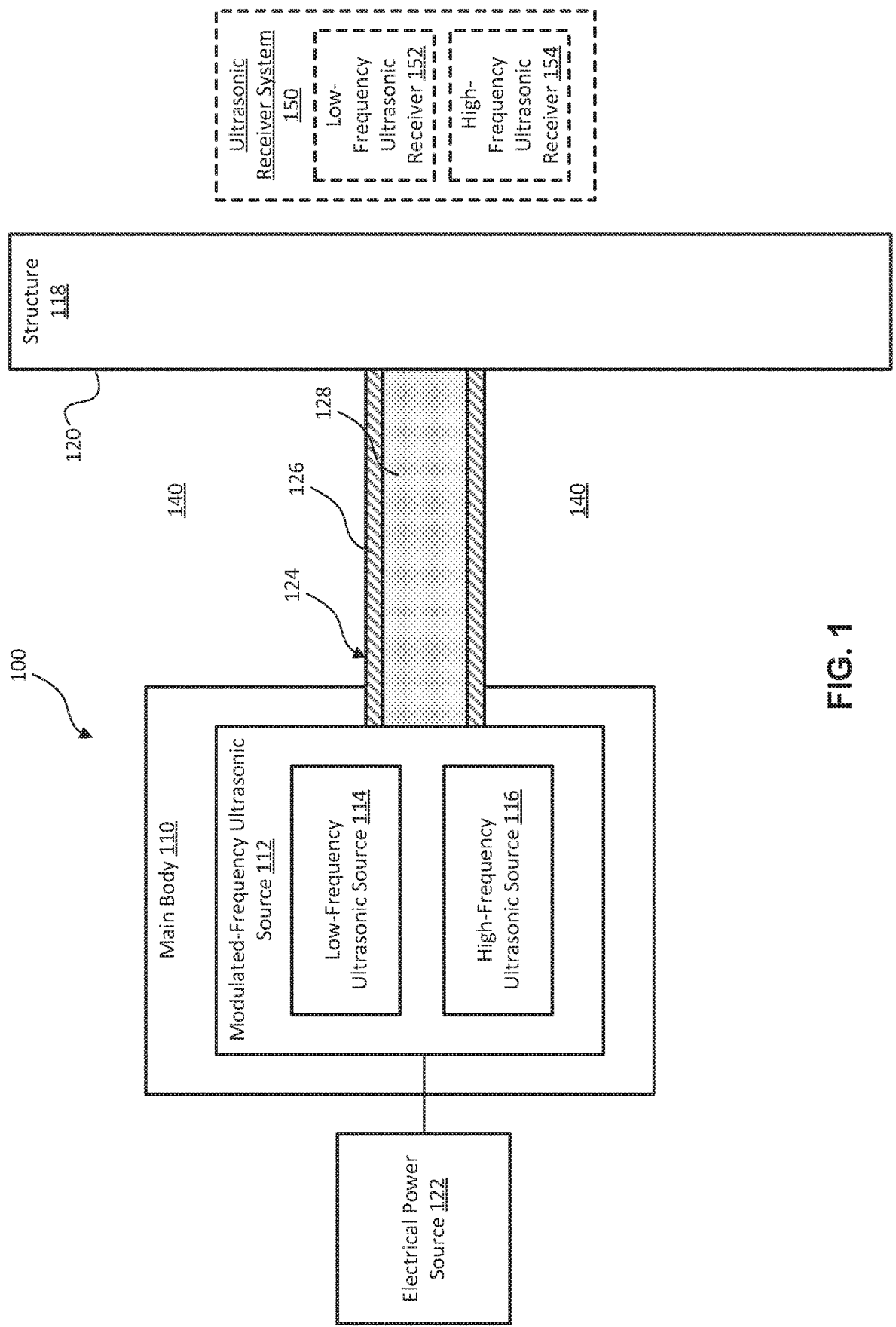
FIG. 1 is a schematic block diagram of a non-destructive inspection (NDI) apparatus inspecting a structure, according to one or more examples of the present disclosure.

Referring to FIG. 1, a non-destructive inspection (NDI) apparatus 100, according to some examples, is shown. The NDI apparatus 100 includes a main body 110 and a modulated-frequency ultrasonic source 112 coupled to the main body 110. The main body 110 provides a base to which the features of the modulated-frequency ultrasonic source 112 can be mounted. In certain examples, the main body 110 includes a housing partially enclosing the modulated-frequency ultrasonic source 112. The main body 110 is movable relative to a structure 118 to be inspected. Accordingly, in some examples, the main body 110 is coupled to a movable object, such as a robot, a wheeled platform (e.g., a cart or a dolly), a sled, or the like. Alternatively, in certain examples, the main body 110 forms part of a hand-held device that is movable manually by the motions of a human operator. In other examples, the main body 110 is fixed and the structure 118 is moved relative to the main body 110. The structure 118 can be any of various structures 118, such as thick aircraft parts made of metal or composite materials.

The modulated-frequency ultrasonic source 112 includes at least one low-frequency ultrasonic source 114 and at least one high-frequency ultrasonic source 116. The low-frequency ultrasonic source 114 is selectively operable to emit a low-frequency ultrasonic beam 126. In contrast, the high-frequency ultrasonic source 116 is selectively operable to emit a high-frequency ultrasonic beam 128. The low-frequency ultrasonic beam 126 has a first frequency and the high-frequency ultrasonic beam 128 has a second frequency. The second frequency is higher than the first frequency. Both the first frequency and the second frequency are within a frequency range customarily identified as ultrasonic. For example, the first frequency and the second frequency are greater than 20,000 Hz, in certain implementations, and greater than 1 MHz, in other implementations. In some examples, the first frequency is between 0.5 MHz and 1 MHz and the second frequency is between 3.5 MHz and 20 MHz. According to certain examples, a ratio of the second frequency to the first frequency is between and 3.5 and 40. According to some examples, the relative frequencies are selected such that the NDI apparatus 100 is capable of inspecting structures that are made of composite materials and have thicknesses up to 1.5 inches, inclusively.

The modulated-frequency ultrasonic source 112 is configured to mix the low-frequency ultrasonic beam 126 and the high-frequency ultrasonic beam 128 to form a modulated-frequency ultrasonic beam 124 at least at a surface 120 of the structure 118. The modulated-frequency ultrasonic source 112 mixes the low-frequency ultrasonic beam 126 and the high-frequency ultrasonic beam 128 via the orientations of at least one low-frequency ultrasonic source 114 and at least one high-frequency ultrasonic source 116, relative to each other, and/or the use of at least one ultrasonically reflective surface 132 (see, e.g., FIG. 2). Accordingly, the various examples of the modulated-frequency ultrasonic source 112 disclosed herein include different configurations of the relative orientations of at least one low-frequency ultrasonic source 114 and at least one high-frequency ultrasonic source 116 and/or different configurations of at least one ultrasonically reflective surface 132.

Each one of the low-frequency ultrasonic source 114 and the high-frequency ultrasonic source 116 is any of various transducer devices that is selectively operable to emit ultrasonic beams. The ultrasonic beams are emitted in response to the low-frequency ultrasonic source 114 and the high-frequency ultrasonic source 116 receiving either a pulse of electrical energy and/or a mechanical impact. In some examples, each one of the low-frequency ultrasonic source 114 and the high-frequency ultrasonic source 116 includes a transducer made of a piezoelectric material. The piezoelectric material can be any of various piezoelectric materials, such as piezoelectric crystals, piezoelectric ceramics, or piezoelectric composites. The piezoelectrical crystals are quartz crystals in one example. The piezoelectric ceramics includes lead metaniobate or lead zirconium titanate in some examples. The piezoelectric composites include multiple piezoelectric elements embedded in an epoxy matrix. Accordingly, in some examples, the low-frequency ultrasonic source 114 is a low-frequency piezoelectric device 142 and the high-frequency ultrasonic source 116 is a high-frequency piezoelectric device 144.

Each one of the low-frequency ultrasonic source 114 and the high-frequency ultrasonic source 116 can include a single ultrasonic-beam emitting element or multiple ultrasonic-beam emitting elements (e.g., an ultrasonic array). Similarly, each one of the low-frequency piezoelectric device 142 and the high-frequency piezoelectric device 144 can include a single piezoelectric element or multiple piezoelectric elements (e.g., an array of piezoelectric elements). Whether including a single element or multiple elements, each one of the low-frequency ultrasonic source 114 and the high-frequency ultrasonic source 116 (e.g., each one of the low-frequency piezoelectric device 142 and the high-frequency piezoelectric device 144) is operable to emit a single ultrasonic beam. Additionally, although the modulated-frequency ultrasonic source 112 of FIG. 1 is shown to include one low-frequency ultrasonic source 114 and one high-frequency ultrasonic source 116, it is recognized that in other examples, as described below, the modulated-frequency ultrasonic source 112 can include multiple low-frequency ultrasonic sources 114 and/or multiple high-frequency ultrasonic sources 116.

In certain examples, the NDI apparatus 100 includes an electrical power source 122 coupled to the modulated-frequency ultrasonic source 112 to supply electrical power to one or both of the low-frequency ultrasonic source 114 and the high-frequency ultrasonic source 116. In response to receipt of electrical power from the electrical power source 122, the low-frequency ultrasonic source 114 and the high-frequency ultrasonic source 116 emit ultrasonic beams. In this manner, selective control of the electrical power to the modulated-frequency ultrasonic source 112 facilitates selective operation of the low-frequency ultrasonic source 114 and the high-frequency ultrasonic source 116.

The NDI apparatus 100 additionally includes an ultrasonic receiver system 150 in some examples. The ultrasonic receiver system 150 includes a high-frequency ultrasonic receiver 154 that is configured to detect ultrasonic waves (having the second frequency associated with the high-frequency ultrasonic beam 128) reflected from the structure 118. Based on the characteristics of the ultrasonic waves detected by the high-frequency ultrasonic receiver 154, the NDI apparatus 100 is able to determine the presence of relatively small anomalies in the structure 118. In some examples, the ultrasonic receiver system 150 additionally includes a low-frequency ultrasonic receiver 152 that is configured to detect ultrasonic waves (having the first frequency associated with the low-frequency ultrasonic beam 126) reflected from the structure 118. Based on the characteristics of the ultrasonic waves detected by the low-frequency ultrasonic receiver 152, the NDI apparatus 100 is able to determine the presence of relatively large anomalies in the structure 118.

The ultrasonic receiver system 150 can be integrated into the main body 110 or be separate from the main body 110. For example, in one implementation, the NDI apparatus 100 utilizes a post-echo process that uses the low-frequency ultrasonic source 114 and/or the high-frequency ultrasonic source 116 of the modulated-frequency ultrasonic source 112 to detect ultrasonic signals reflected from (e.g., reflected back from) the structure 118. In contrast, according to another implementation, the ultrasonic receiver system 150 is locatable on an opposite side of the structure 118 than that of the main body 110 and the NDI apparatus 100 utilizes a pitch-catch process that uses a low-frequency ultrasonic receiver 152 and/or a high-frequency ultrasonic receiver 154, separate from the low-frequency ultrasonic source 114 and/or the high-frequency ultrasonic source 116, to detect ultrasonic signals reflected from (e.g., passing through) the structure 118.

To help facilitate transmission of the low-frequency ultrasonic beam 126, the high-frequency ultrasonic beam 128, and/or the modulated-frequency ultrasonic beam 124 from the modulated-frequency ultrasonic source 112 to the surface 120 of the structure 118, an ultrasonic transmission medium 140 or ultrasonic coupling media is situated between the structure 118 and the main body 110. By reducing the impedance between the modulated-frequency ultrasonic source 112 and the structure 118, the ultrasonic transmission medium 140 helps to reduce the attenuation of the low-frequency ultrasonic beam 126, the high-frequency ultrasonic beam 128, and/or the modulated-frequency ultrasonic beam 124 as the beams transmit from the modulated-frequency ultrasonic source 112 to the surface 120 of the structure 118. In some examples, the ultrasonic transmission medium 140 is one of water, an ultrasonic coupling fluid, or anultrasonic coupling gel.

In other examples, the ultrasonic transmission medium 140 is air. Typically, the impedance of air is sufficiently high that the high-frequency ultrasonic beam 128 alone would not adequately transmit to the surface 120 of the structure 118 for inspection purposes. In contrast, because the low-frequency ultrasonic beam 126 is able to transmit through air better than the high-frequency ultrasonic beam 128, the low-frequency ultrasonic beam 126 can adequately transmit to the surface 120 of the structure 118. Due to the low-frequency ultrasonic beam 126 acting as a carrier beam to carry the high-frequency ultrasonic beam 128 to the surface 120 of the structure 118, in some examples, the modulated-frequency ultrasonic beam 124 is capable of adequately transmitting the high-frequency ultrasonic beam component of the modulated-frequency ultrasonic beam 124 to the surface 120 of the structure 118 with an ultrasonic transmission medium 140 made of air.

Figure 2:
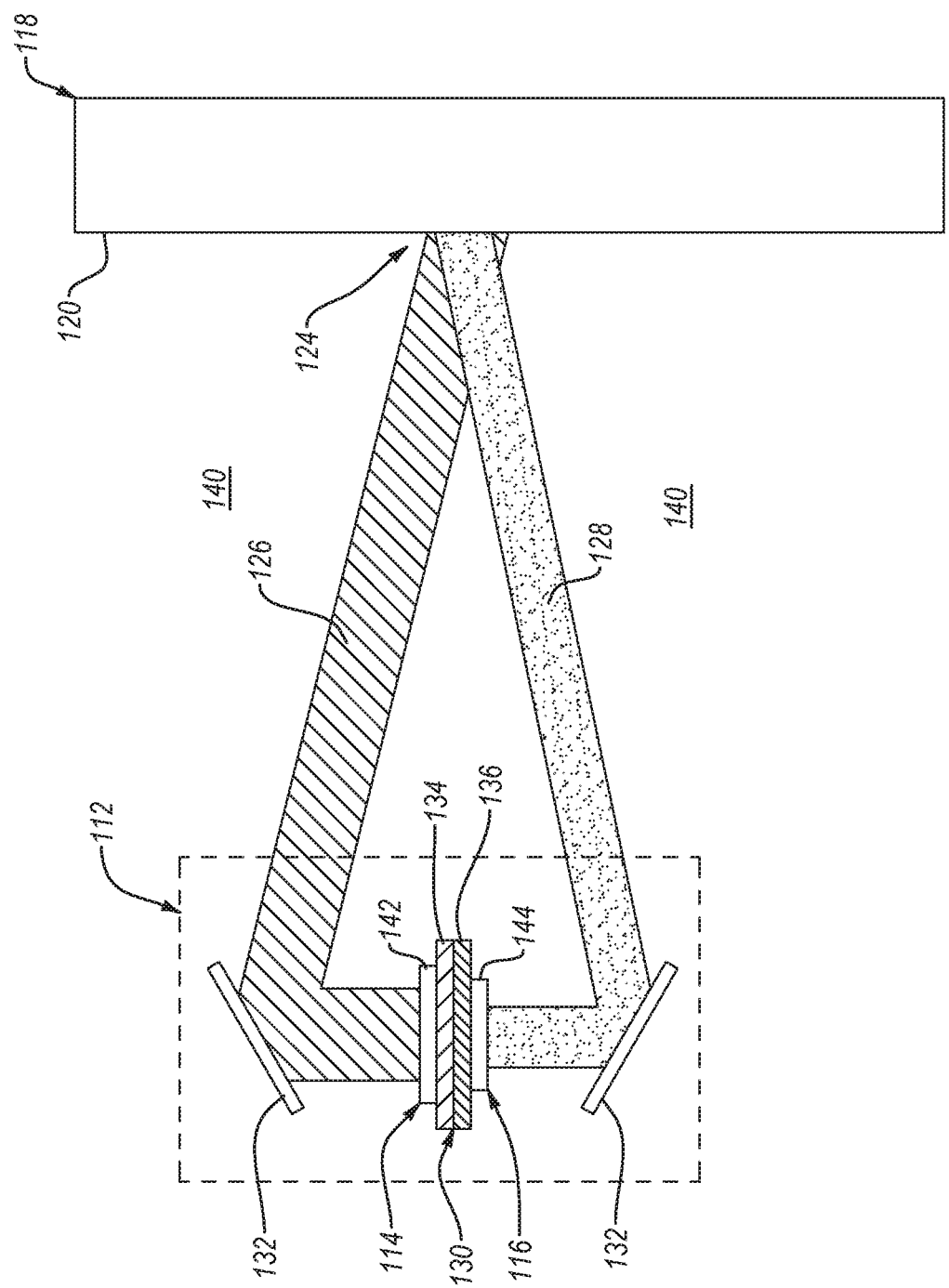
FIG. 2 is a side view of the NDI apparatus of FIG. 1, according to one or more examples of the present disclosure.

Referring to the example shown in FIG. 2, the modulated-frequency ultrasonic source 112 additionally includes two ultrasonically reflective surfaces 132. Each of the two ultrasonically reflective surfaces 132 are positioned to reflect (e.g., receive and redirect) a corresponding one of the low-frequency ultrasonic beam 126 and the high-frequency ultrasonic beam 128. Accordingly, one of the ultrasonically reflective surfaces 132 is positioned relative to the low-frequency ultrasonic source 114 to reflect the low-frequency ultrasonic beam 126 toward the surface 120 of the structure 118 and toward the high-frequency ultrasonic beam 128. Similarly, another one of the ultrasonically reflective surfaces 132 is positioned relative to the high-frequency ultrasonic source 116 to reflect the high-frequency ultrasonic beam 128 toward the surface 120 of the structure 118 and toward the low-frequency ultrasonic beam 126. Generally, each one of the ultrasonically reflective surfaces 132 is angled relative to the corresponding one of the low-frequency ultrasonic source 114 and the high-frequency ultrasonic source 116 such that the reflected portion of the corresponding one of the low-frequency ultrasonic beam 126 and the high-frequency ultrasonic beam 128 is angled relative to the beams before reflection.

The ultrasonically reflective surfaces 132 can have any of various shapes based on a desired shape (e.g., divergence, convergence, or non-divergent and non-convergent) of the beam reflected by the ultrasonically reflective surfaces 132 relative to the shape of the beam received by the ultrasonically reflective surfaces 132. For example, in certain implementations, the ultrasonically reflective surfaces 132 are flat such that the shape of the reflected beam matches the shape of the received beam (e.g., neither convergent nor divergent relative to the received beam). However, in other examples, the ultrasonically reflective surfaces 132 are concave such that the shape of the reflected beam converges relative to the shape of the received beam. In yet other examples, the ultrasonically reflective surfaces 132 are convex such that the shape of the reflected beam diverges relative to the shape of the received beam.

Each one of the reflective surfaces 132 forms part of a corresponding mirror in certain examples. Accordingly, the reflective surfaces 132 are defined by a reflective material or coating applied onto a base or backing of the mirror. The reflective material has an impedance that is sufficiently mis-matched with the impedance of the ultrasonic transmission medium 140 that a substantial portion of the ultrasonic beam received by the reflective material reflects off of the reflective material, rather than passing through it. Depending on the impedance of the ultrasonic transmission medium 140, in some examples, the reflective material of the reflective surfaces 132 is made of a material, such as glass, carbon fiber, aluminum, resin polymer, or a composite of said materials.

The low-frequency ultrasonic source 114 and the high-frequency ultrasonic source 116 are in a back-to-back configuration in the example of the modulated-frequency ultrasonic source 112 of FIG. 2. In other words, the broad ultrasonic beam-emitting faces of the low-frequency ultrasonic source 114 and the high-frequency ultrasonic source 116 overlap across a hypothetical plane that is parallel to the broad ultrasonic beam-emitting faces. The modulated-frequency ultrasonic source 112 additionally includes a vibration damper 130 or dampening compound that is interposed between the low-frequency ultrasonic source 114 and the high-frequency ultrasonic source 116. In certain examples, the low-frequency ultrasonic source 114 and the high-frequency ultrasonic source 116 abut the vibration damper 130. The vibration damper 130 is sized to extend along an entirety of the interface between the low-frequency ultrasonic source 114 and the high-frequency ultrasonic source 116.

The vibration damper 130 is configured to prevent the emission of ultrasonic beams from the low-frequency ultrasonic source 114 and the high-frequency ultrasonic source 116 toward each other. Accordingly, the vibration damper 130 is made of a material that sufficiently dampens vibrations on facings sides of the low-frequency ultrasonic source 114 and the high-frequency ultrasonic source 116 that ultrasonic beams are not generated and emitted from the facings sides of the low-frequency ultrasonic source 114 and the high-frequency ultrasonic source 116. In some examples, the vibration damper 130 is made of any of various vibration damping materials or devices, such as, but not limited to, polymers (e.g., polyurethane rubbers), springs, foams, or combinations thereof.

The effectiveness of a vibration damping material at damping vibrations and thus preventing the emission of ultrasonic beams is dependent on the type or configuration of the ultrasonic transducer and thus the frequency of the ultrasonic beam emitted by the ultrasonic transducer. For example, some vibration damping materials dampen vibrations that result in low-frequency ultrasonic beams better than vibrations that results in high-frequency ultrasonic beams, and vice versa. Accordingly, in certain examples, the vibration damper 130 includes multiple layers each made of a different vibration damping material. As shown in FIG. 2, a vibration damping material 134 of the vibration damper 130 is interposed between the low-frequency ultrasonic source 114 and a vibration damping material 136 of the vibration damper 130, and the vibration damping material 136 is interposed between the vibration damping material 134 and the high-frequency ultrasonic source 116. In such examples, the vibration damping material 134 of the layer abutting the low-frequency ultrasonic source 114 is different than the vibration damping material 136 abutting the high-frequency ultrasonic source 116. The vibration damping material 134 is configured to dampen vibrations that result in emission of low-frequency ultrasonic beams and the vibration damping material 136 is configured to dampen vibrations that result in emission of high-frequency ultrasonic beams. Therefore, an acoustic damping coefficient of the ultrasonic damping material 134 is lower than an acoustic damping coefficient of the ultrasonic damping material 136.

With the low-frequency ultrasonic source 114 and the high-frequency ultrasonic source 116 of the modulated-frequency ultrasonic source 112 of FIG. 2 arranged in the back-to-back configuration and the vibration damper 130 interposed between the low-frequency ultrasonic source 114 and the high-frequency ultrasonic source 116, when the low-frequency ultrasonic source 114 is activated it emits the low-frequency ultrasonic beam 126 in substantially only a first direction away from the high-frequency ultrasonic source 116 and when the high-frequency ultrasonic source 116 is activated it emits the high-frequency ultrasonic beam 128 in substantially only a second direction away from the low-frequency ultrasonic source 114. The low-frequency ultrasonic source 114 and the high-frequency ultrasonic source 116 can be activated in response to receiving an electrical power pulse from the electrical power source 122. The first direction is substantially opposite (e.g., less than 3-degrees of) the second direction. It is recognized that ultrasonic beams emitted from ultrasonic beam transducers radiate in multiple directions, even when emitted from one side of the ultrasonic beam transducers. Accordingly, as used herein, an ultrasonic beam is emitted in a particular direction when the broad ultrasonic beam-emitting face of the transducer faces the particular direction and when a concentration or majority of the ultrasonic beam transmits in the particular direction. For this reason, to help indicate the directionality of the ultrasonic beams, the ultrasonic beams are shown schematically as well-defined and delineated beams, even though portions of the beams radiate away from the illustrated beam path.

Because the low-frequency ultrasonic beam 126 and the high-frequency ultrasonic beam 128 are emitted in opposite directions, they are initially separate from each other. However, the ultrasonically reflective surfaces 132 are positioned to reflect corresponding ones of the low-frequency ultrasonic beam 126 and the high-frequency ultrasonic beam 128 such that the low-frequency ultrasonic beam 126 and the high-frequency ultrasonic beam 128 are combined or mixed together, to form the modulated-frequency ultrasonic beam 124, at least at the surface 120 of the structure 118 under inspection. Accordingly, the ultrasonically reflective surfaces 132 are angled, relative to the first direction and the second direction, to redirect the low-frequency ultrasonic beam 126 and the high-frequency ultrasonic beam 128 toward a combination or mixing location at the surface 120 or at some location between the surface 120 and the modulated-frequency ultrasonic source 112.

Because the low-frequency ultrasonic beam 126 and the high-frequency ultrasonic beam 128 converge at the combination or mixing location (e.g., focal point), the ultrasonically reflective surfaces 132 are angled, relative to the first direction and the second direction, to redirect the low-frequency ultrasonic beam 126 and the high-frequency ultrasonic beam 128 toward each other. According to the principles of ultrasonic beam modulation, as described above, when the high-frequency ultrasonic beam 128 is mixed with the low-frequency ultrasonic beam 126, the low-frequency ultrasonic beam 126 helps propagate the high-frequency ultrasonic beam 128 and reduce the attenuation of the high-frequency ultrasonic beam 128 through the ultrasonic transmission medium 140 and the structure 118. Moreover, depending on the velocity of the transmission medium 140 and/or the distance the low-frequency ultrasonic beam 126 and the high-frequency ultrasonic beam 128 travel to get to the focal point, the positions of the low-frequency ultrasonic source 114 and/or the high-frequency ultrasonic source 116 relative to the focal point can be adjusted to adjust the relative arrival times of the low-frequency ultrasonic beam 126 and the high-frequency ultrasonic beam 128 at the focal point to produce a constructive modulated-frequency ultrasonic beam 124.

Figure 3B:
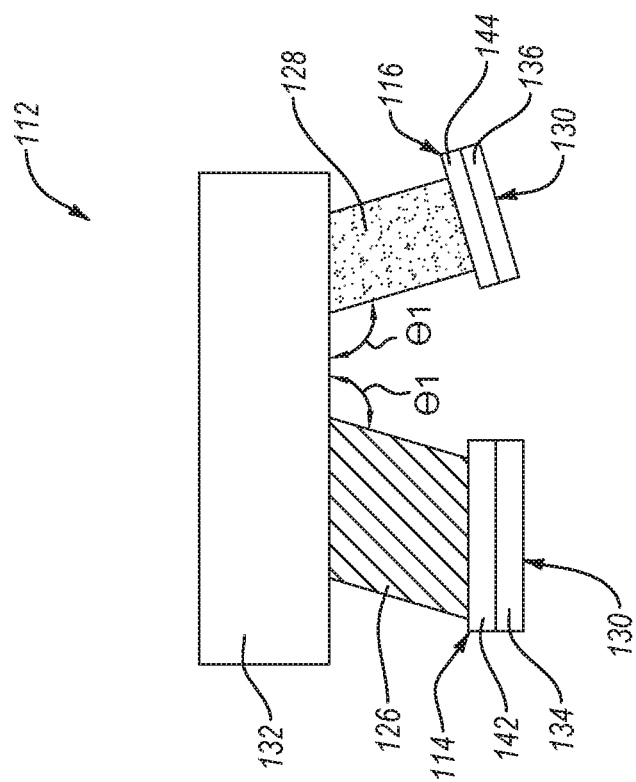
FIG. 3B is an end view of the NDI apparatus of FIG. 3A, according to one or more examples of the present disclosure.

According to another example of the modulated-frequency ultrasonic source 112, as shown in FIG. 3A, the low-frequency ultrasonic source 114 and the high-frequency ultrasonic source 116 are in a side-by-side configuration. In the side-by-side configuration, the low-frequency ultrasonic source 114 and the high-frequency ultrasonic source 116 are the same distance (e.g., a distance D1) away from the surface 120 of the structure 118. Additionally, the low-frequency ultrasonic source 114 and the high-frequency ultrasonic source 116 overlap across a hypothetical plane that is substantially perpendicular to the broad ultrasonic beam-emitting faces of the low-frequency ultrasonic source 114 and the high-frequency ultrasonic source 116. The modulated-frequency ultrasonic source 112 of the example of FIG. 3A additionally includes a vibration damper 130 abutting one side of each of the low-frequency ultrasonic source 114 and the high-frequency ultrasonic source 116. For example, the vibration damping material 134 abuts one side of the low-frequency ultrasonic source 114 and the vibration damping material 136 abuts one side of the high-frequency ultrasonic source 116. However, in some implementations of the example of FIGS. 3A-3C, the modulated-frequency ultrasonic source 112 does not include vibration dampers 130. The low-frequency ultrasonic source 114 and the high-frequency ultrasonic source 116 emit, in similar directions, the low-frequency ultrasonic beam 126 and the high-frequency ultrasonic beam 128, respectively, from sides opposite the sides abutting the vibration damping materials. The modulated-frequency ultrasonic source 112 also includes at least one ultrasonically reflective surface 132. As shown in the examples of FIGS. 3B and 3A, the relative configurations (e.g., quantity and orientation) of the at least one ultrasonically reflective surface 132 and the low-frequency ultrasonic source 114 and the high-frequency ultrasonic source 116 can vary.

In FIG. 3B, which is taken from an end of the modulated-frequency ultrasonic source 112 (such that the structure 118 would be located into the page), the modulated-frequency ultrasonic source 112 includes only one ultrasonically reflective surface 132. Additionally, the low-frequency ultrasonic source 114 and the high-frequency ultrasonic source 116 are angled relative to each other and to the ultrasonically reflective surface 132 such that an angle θ1 is defined between the ultrasonically reflective surface 132 and the direction of each one of the low-frequency ultrasonic beam 126 and the high-frequency ultrasonic beam 128.

The angle θ1 is selected such that the low-frequency ultrasonic beam 126 and the high-frequency ultrasonic beam 128 are reflected off of the single ultrasonically reflective surface 132 and converge to form the modulated-frequency ultrasonic beam 124, as described above and shown in FIG. 3A. Although the angle θ1 may be the same for both the low-frequency ultrasonic beam 126 and the high-frequency ultrasonic beam 128, to converge the ultrasonic beams 126, the directions of the low-frequency ultrasonic beam 126 and the high-frequency ultrasonic beam 128, when emitted from the low-frequency ultrasonic source 114 and the high-frequency ultrasonic source 116, respectively, are different. The difference between the directions of the low-frequency ultrasonic beam 126 and the high-frequency ultrasonic beam 128 corresponds with the angle θ1. In some implementations of the example of FIG. 3B, the single ultrasonically reflective surface 132 can be separated into two angularly matching reflective surfaces 132.

Figure 3C:
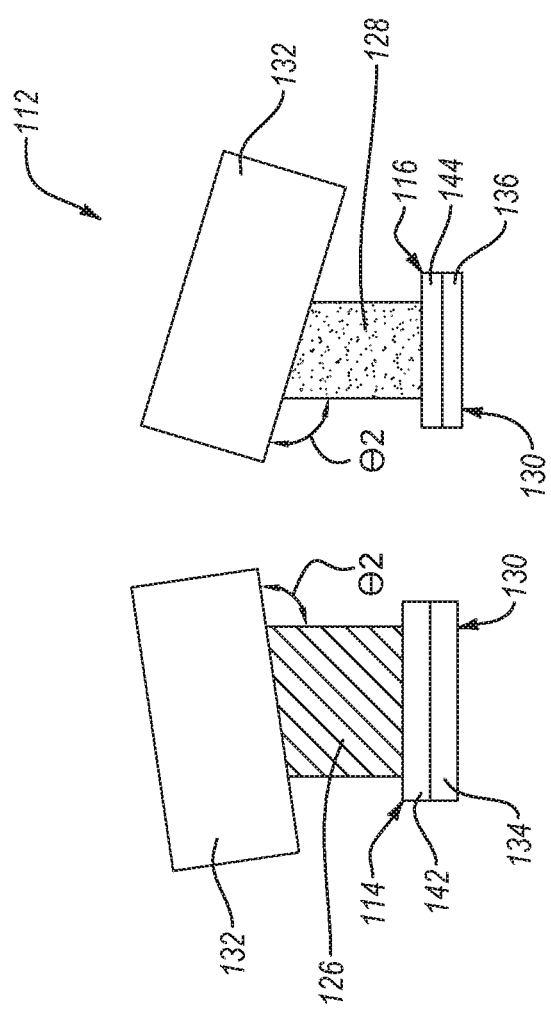
FIG. 3C is an end view of the NDI apparatus of FIG. 3A, according to one or more examples of the present disclosure.

In contrast to the example of FIG. 3B, in the example of FIG. 3C, which is taken from an end of the modulated-frequency ultrasonic source 112 (such that the structure 118 would be located into the page), the modulated-frequency ultrasonic source 112 includes two ultrasonically reflective surfaces 132. Additionally, the ultrasonically reflective surfaces 132 are angled relative to each other and to the direction of a corresponding one of the low-frequency ultrasonic beam 126 and the high-frequency ultrasonic beam 128 such that an angle θ2 is defined between each one of the ultrasonically reflective surfaces 132 and the direction of a corresponding one of the low-frequency ultrasonic beam 126 and the high-frequency ultrasonic beam 128. Accordingly, in the example of FIG. 3C, the directions of the low-frequency ultrasonic beam 126 and the high-frequency ultrasonic beam 128 are the same and the ultrasonically reflective surfaces 132 are angled relative to the ultrasonic beams.

The angle θ2 is selected such that the low-frequency ultrasonic beam 126 and the high-frequency ultrasonic beam 128 are reflected off of corresponding ones of the ultrasonically reflective surfaces 132 and converge to form the modulated-frequency ultrasonic beam 124, as described above and shown in FIG. 3A. Although the directions of the low-frequency ultrasonic beam 126 and the high-frequency ultrasonic beam 128 are shown to be the same, in some implementations of the example of FIG. 3C, the directions of the low-frequency ultrasonic beam 126 and the high-frequency ultrasonic beam 128 can be different, such that the angles θ2 associated with the ultrasonically reflective surfaces 132 are different. Additionally, in certain implementations, the ultrasonically reflective surfaces 132 can be combined into a single ultrasonically reflective surface 132 with angled portions.

Figure 4:
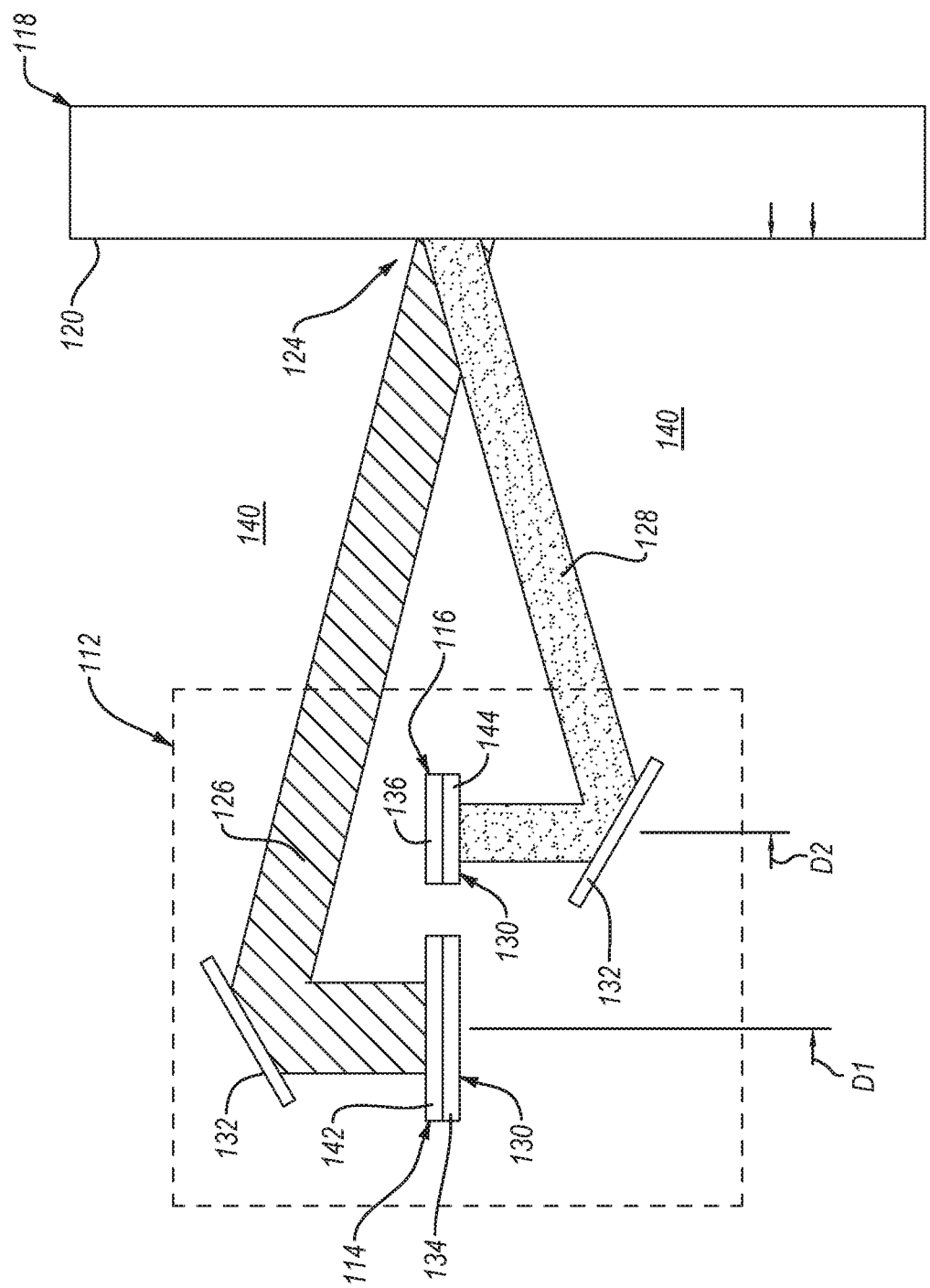
FIG. 4 is a side view of the NDI apparatus of FIG. 1, according to one or more examples of the present disclosure.

According to another example of the modulated-frequency ultrasonic source 112, as shown in FIG. 4, the low-frequency ultrasonic source 114 and the high-frequency ultrasonic source 116 are in a front-to-back configuration. In the front-to-back configuration, the low-frequency ultrasonic source 114 and the high-frequency ultrasonic source 116 are at different distances away from the surface 120 of the structure 118. For example, the low-frequency ultrasonic source 114 is at a first distance D1 and the high-frequency ultrasonic source 116 is at a second distance D2 away from the surface 120 of the structure 118. Additionally, in the front-to-back configuration, the high-frequency ultrasonic source 116 is between the low-frequency ultrasonic source 114 and the surfaces 120 of the structure 118. Locating the high-frequency ultrasonic source 116 closer to the surface 120 than the low-frequency ultrasonic source 114 reduces the distance the high-frequency ultrasonic beam 128 must travel before converging with the low-frequency ultrasonic beam 126, which helps reduce attenuation of the high-frequency ultrasonic beam 128. The modulated-frequency ultrasonic source 112 of the example of FIG. 4 additionally includes a vibration damper 130 abutting one side of each of the low-frequency ultrasonic source 114 and the high-frequency ultrasonic source 116 as described above. However, in some implementations of the example of FIG. 4, the modulated-frequency ultrasonic source 112 does not include vibration dampers 130.

In the example of FIG. 4, the low-frequency ultrasonic source 114 and the high-frequency ultrasonic source 116 emit the low-frequency ultrasonic beam 126 and the high-frequency ultrasonic beam 128 in substantially opposite directions. The modulated-frequency ultrasonic source 112 also includes two ultrasonically reflective surfaces 132. Each one of the two ultrasonically reflective surfaces 132 reflect a corresponding one of the low-frequency ultrasonic beam 126 and the high-frequency ultrasonic beam 128 to converge to form the modulated-frequency ultrasonic beam 124 at or before the surface 120 of the structure 118. The ultrasonically reflective surface 132 receiving the high-frequency ultrasonic beam 128 is closer to the surface 120 than the ultrasonically reflective surface 132 receiving the low-frequency ultrasonic beam 126.

Figure 5:
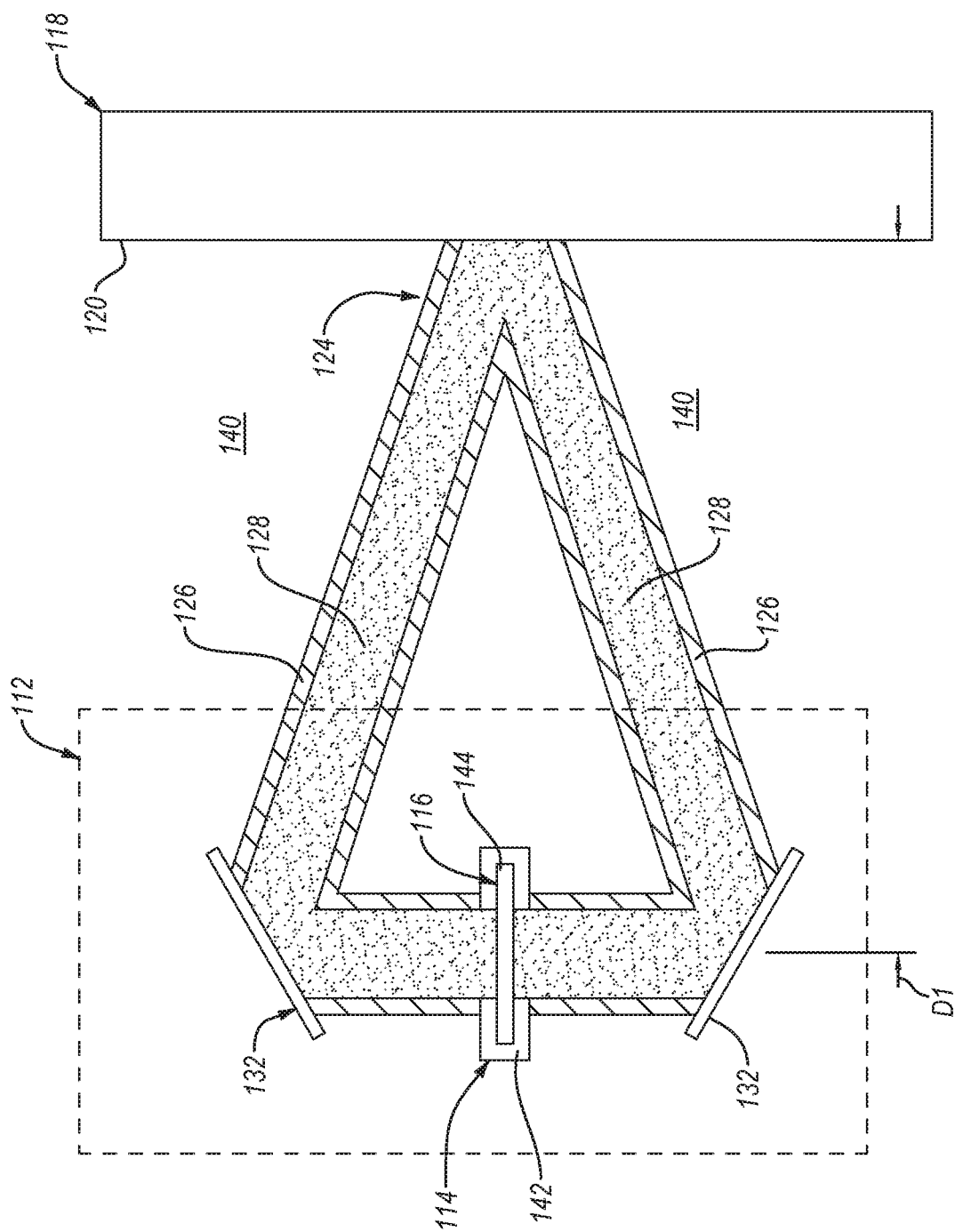
FIG. 5 is a side view of the NDI apparatus of FIG. 1, according to one or more examples of the present disclosure.

According to yet another example of the modulated-frequency ultrasonic source 112, as shown in FIG. 5, the low-frequency ultrasonic source 114 and the high-frequency ultrasonic source 116 are in a side-by-side configuration, similar to the examples of FIGS. 3A-3C. However, unlike the examples of FIGS. 3A-3C, the modulated-frequency ultrasonic source 112 does not include vibration dampers 130. Accordingly, each one of the low-frequency ultrasonic source 114 and the high-frequency ultrasonic source 116 of the example of FIG. 5 emit ultrasonic beams from both sides of the ultrasonic source. More specifically, the low-frequency ultrasonic source 114 emits a low-frequency ultrasonic beam 126 in a first direction and emits a second low-frequency ultrasonic beam 126 in a second direction opposite the first direction. Similarly, the high-frequency ultrasonic source 116 emits a high-frequency ultrasonic beam 128 in a first direction and emits a second high-frequency ultrasonic beam 128 in a second direction opposite the first direction. In view of the features of the examples of FIGS. 3B and 3C, either one or multiple ultrasonically reflective surfaces 132 reflect the low-frequency ultrasonic beam 126 and the high-frequency ultrasonic beam 128 to converge and mix together to form the modulated-frequency ultrasonic beam 124 before penetrating the structure 118. Similarly, either one or multiple ultrasonically reflective surfaces 132 reflect the second low-frequency ultrasonic beam 126 and the second high-frequency ultrasonic beam 128 to converge and mix together, along with the low-frequency ultrasonic beam 126 and the high-frequency ultrasonic beam 128, to form the modulated-frequency ultrasonic beam 124 before penetrating the structure 118. Accordingly, more than two ultrasonic beams (two high-frequency and two low-frequency) are mixed to form the modulated-frequency ultrasonic beam 124.

Figure 6:
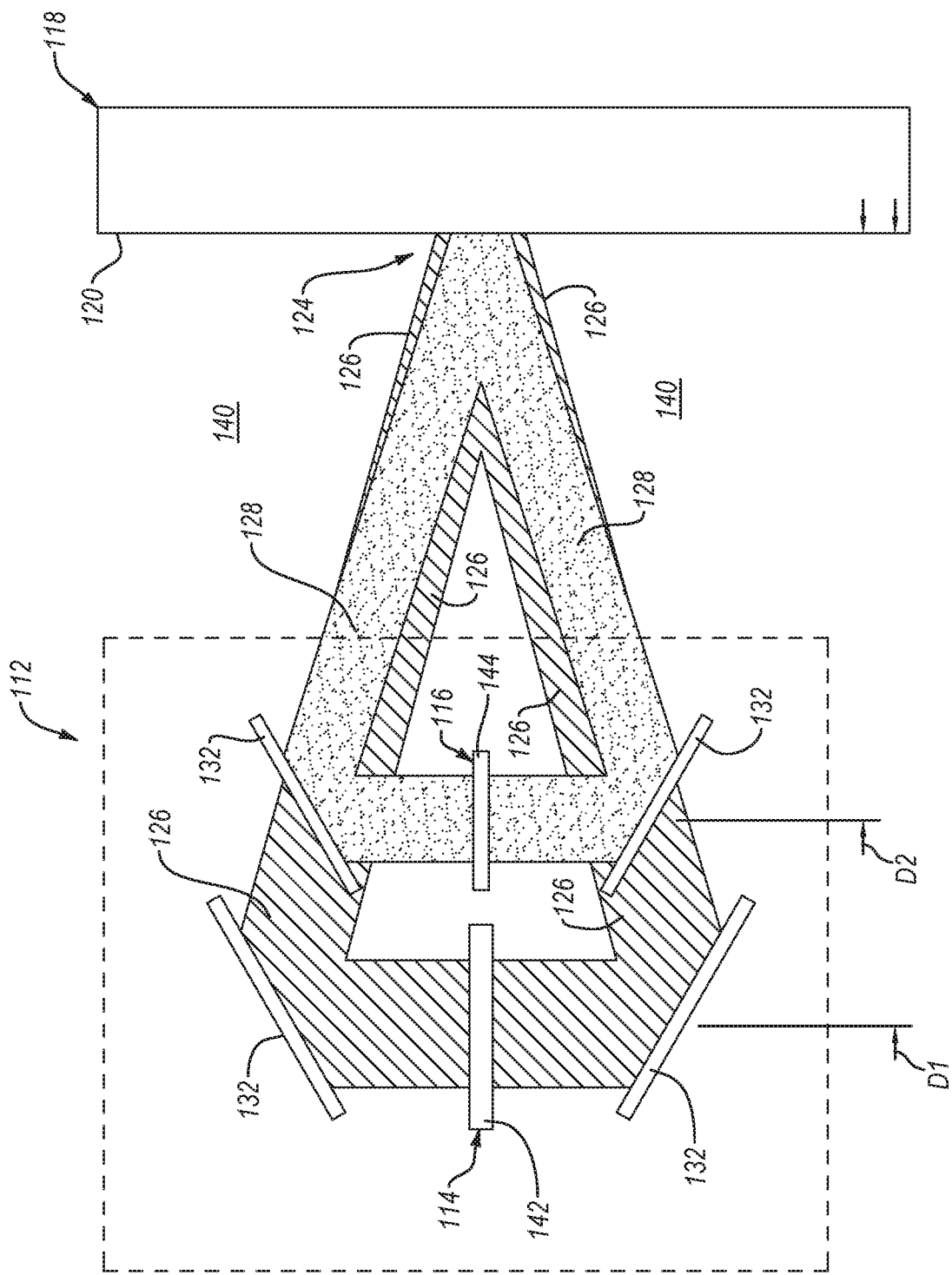
FIG. 6 is a side view of the NDI apparatus of FIG. 1, according to one or more examples of the present disclosure.

According to an additional example of the modulated-frequency ultrasonic source 112, as shown in FIG. 6, the low-frequency ultrasonic source 114 and the high-frequency ultrasonic source 116 are in a front-to-back configuration, similar to the example of FIG. 4. However, unlike the example of FIG. 4, the modulated-frequency ultrasonic source 112 does not include vibration dampers 130. Accordingly, each one of the low-frequency ultrasonic source 114 and the high-frequency ultrasonic source 116 of the example of FIG. 6, like that of the example of FIG. 5, emit ultrasonic beams from both sides of the ultrasonic source. The modulated-frequency ultrasonic source 112 of the example of FIG. 6 includes at least four ultrasonically reflective surfaces 132. A first one of the ultrasonically reflective surfaces 132 reflects the low-frequency ultrasonic beam 126 to a convergence location. A second one of the ultrasonically reflective surfaces 132 reflects the high-frequency ultrasonic beam 128 to the convergence location. A third one of the ultrasonically reflective surfaces 132 reflects the second low-frequency ultrasonic beam 126 to the convergence location. A fourth one of the ultrasonically reflective surfaces 132 reflects the second high-frequency ultrasonic beam 128 to the convergence location. At the convergence location, the four ultrasonic beams converge and mix together to form the modulated-frequency ultrasonic beam 124 before penetrating the structure 118. Like the example of FIG. 5, in the example of FIG. 6, more than two ultrasonic beams (two high-frequency and two low-frequency) are mixed to form the modulated-frequency ultrasonic beam 124.

Because the ultrasonic sources of the examples of FIGS. 5 and 6 are configured to emit ultrasonic beams from both sides of the ultrasonic sources, the modulated-frequency ultrasonic source 112 of FIGS. 5 and 6 promotes higher power efficiency, lower power consumption, and a modulated-frequency ultrasonic beam with higher energy compared to other configurations.

Figure 7A:
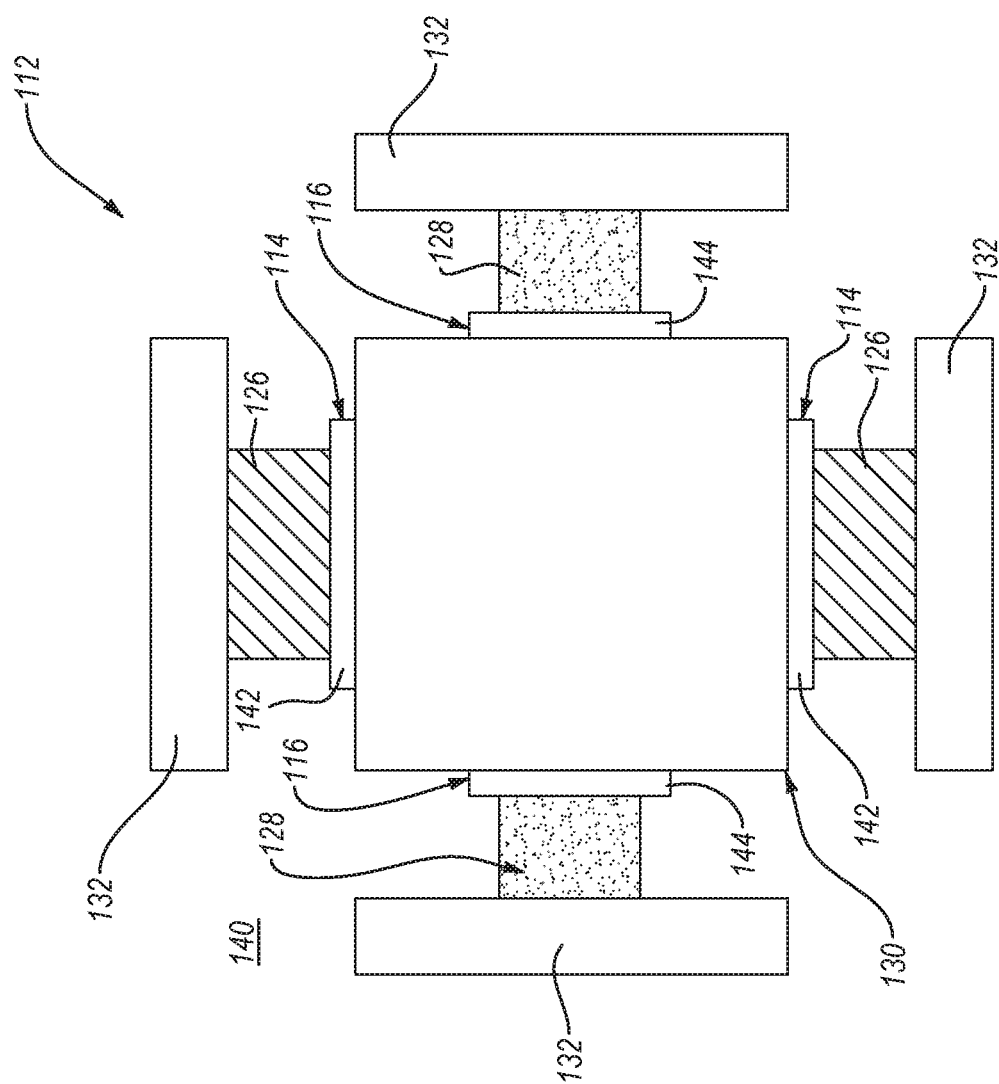
FIG. 7A is an end view of the NDI apparatus of FIG. 1, according to one or more examples of the present disclosure.

According to yet another example, as shown in FIG. 7A, the modulated-frequency ultrasonic source 112 includes a plurality of low-frequency ultrasonic sources 114 and a plurality of high-frequency ultrasonic sources 116. The modulated-frequency ultrasonic source 112 also includes a single vibration damper 130 that is coupled to the ultrasonic sources. The vibration damper 130 helps to facilitate the emission of a single ultrasonic beam from each of the ultrasonic sources. For example, one of the plurality of low-frequency ultrasonic sources 114 emits a low-frequency ultrasonic beam 126 in a first direction and a second one of the plurality of low-frequency ultrasonic sources 114 emits a second low-frequency ultrasonic beam 126 in a second direction different than (e.g., opposite) the first direction. Similarly, for example, one of the plurality of high-frequency ultrasonic sources 116 emits a high-frequency ultrasonic beam 128 in a third direction, different than the first direction and the second direction, and a second one of the plurality of high-frequency ultrasonic sources 116 emits a second high-frequency ultrasonic beam 128 in a fourth direction different than (e.g., perpendicular to) the first direction and the second direction, and different than (e.g., opposite) the third direction. The modulated-frequency ultrasonic source 112 further includes a plurality of ultrasonically reflective surfaces 132 with each one configured to reflect a corresponding one of the ultrasonic beams to converge to form a modulated-frequency ultrasonic beam 124.

Because the modulated-frequency ultrasonic source 112 of FIG. 7A includes multiple low-frequency ultrasonic sources 114 and multiple high-frequency ultrasonic sources 116, resulting in at least four ultrasonic beams combined to form the modulated-frequency ultrasonic beam 124, the modulated-frequency ultrasonic source 112 facilitates generation of a modulated-frequency ultrasonic beam 124 with a higher power compared to examples of the modulated-frequency ultrasonic source 112 with fewer low-frequency or high-frequency ultrasonic sources. Accordingly, the modulated-frequency ultrasonic source 112 of FIG. 7A can be used to inspect structures 118 that required a higher-powered modulated-frequency ultrasonic beam 124 for inspection. However, the same modulated-frequency ultrasonic source 112 can be used to inspect structures 118 for which a lower-powered modulated-frequency ultrasonic beam 124 is desired by disabling one or more of the low-frequency ultrasonic sources 114 and high-frequency ultrasonic sources 116.

In the example of FIG. 7A, the modulated-frequency ultrasonic source 112 includes an equal quantity of low-frequency ultrasonic sources 114 and high-frequency ultrasonic sources 116. However, in other examples, the modulated-frequency ultrasonic source 112 can have an unequal quantity of low-frequency ultrasonic sources 114 and high-frequency ultrasonic sources 116. As shown in the example of FIG. 7B, the modulated-frequency ultrasonic source 112 has, as an example, three high-frequency ultrasonic sources 116 and one low-frequency ultrasonic source 114.

Figure 7B:
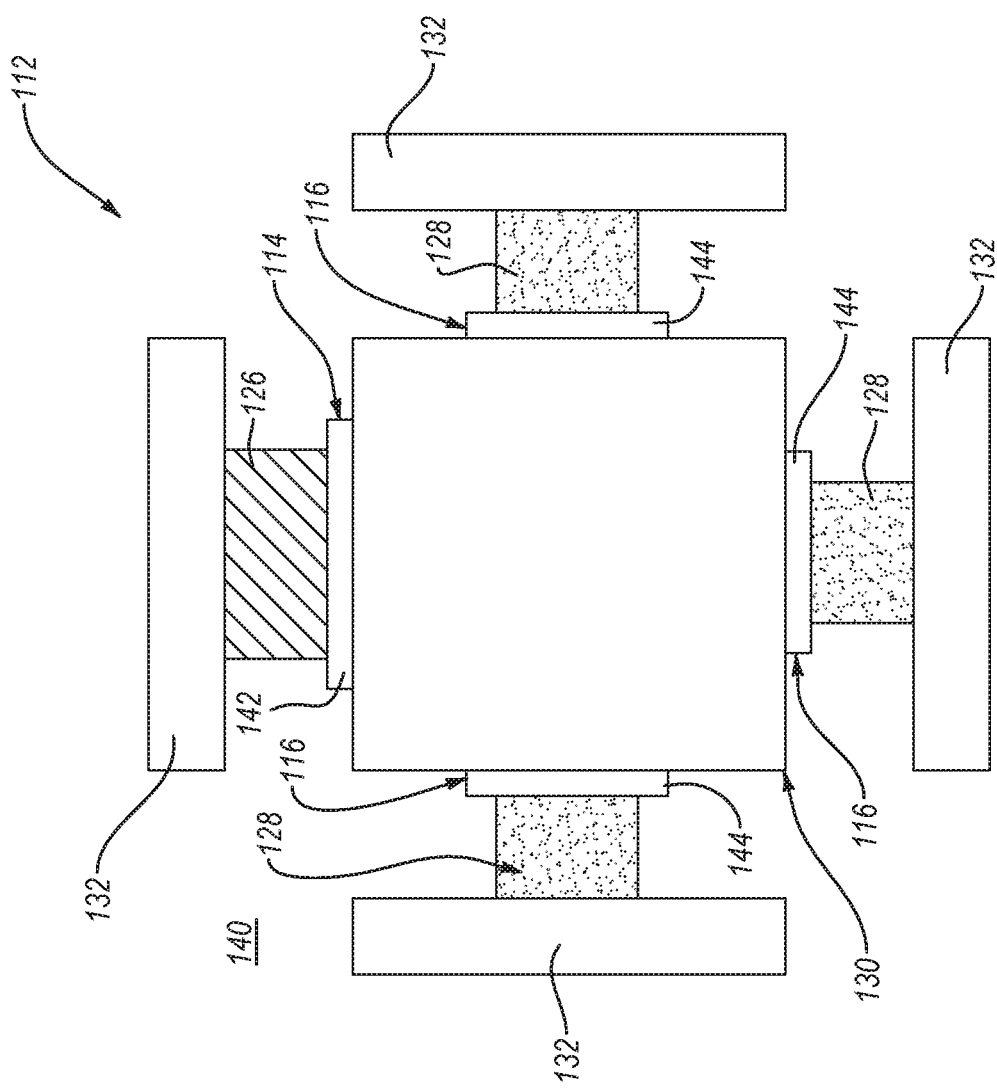
FIG. 7B is an end view of the NDI apparatus of FIG. 1, according to one or more examples of the present disclosure.
Figure 7C:
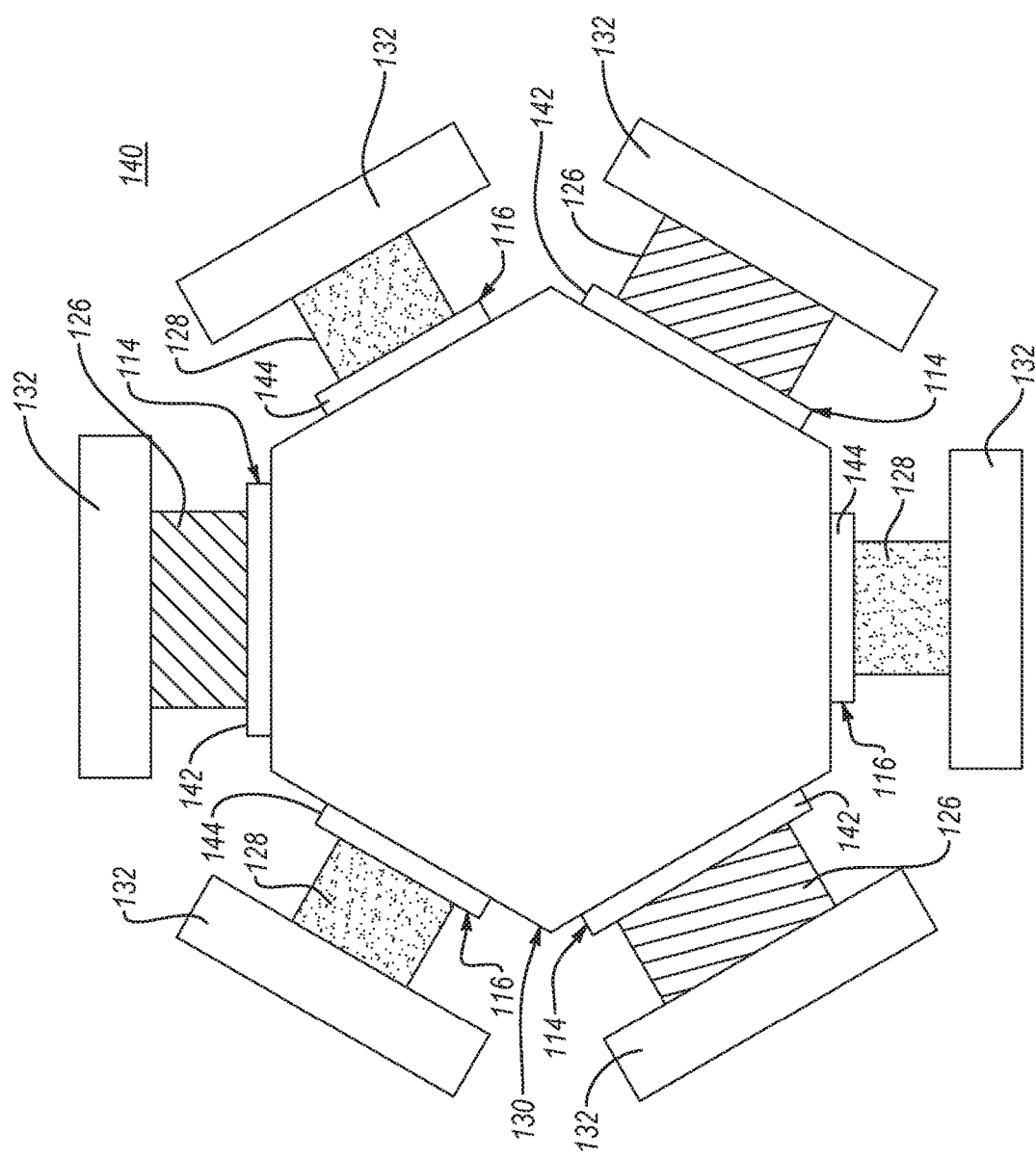
FIG. 7C is an end view of the NDI apparatus of FIG. 1, according to one or more examples of the present disclosure.

Also, in the example of FIGS. 7A and 7B, the modulated-frequency ultrasonic source 112 includes four total low-frequency and high-frequency ultrasonic sources. However, in other examples, the modulated-frequency ultrasonic source 112 can include three or more than four total low-frequency and high-frequency ultrasonic sources. As shown in the example of FIG. 7C, the modulated-frequency ultrasonic source 112 has, as an example, three high-frequency ultrasonic sources 116 and three low-frequency ultrasonic sources 114. But is it recognized that any combination of high-frequency ultrasonic sources 116 and low-frequency ultrasonic sources 114 can be used and in any arrangement (alternating, or otherwise) on the vibration damper 130.

Figure 8:
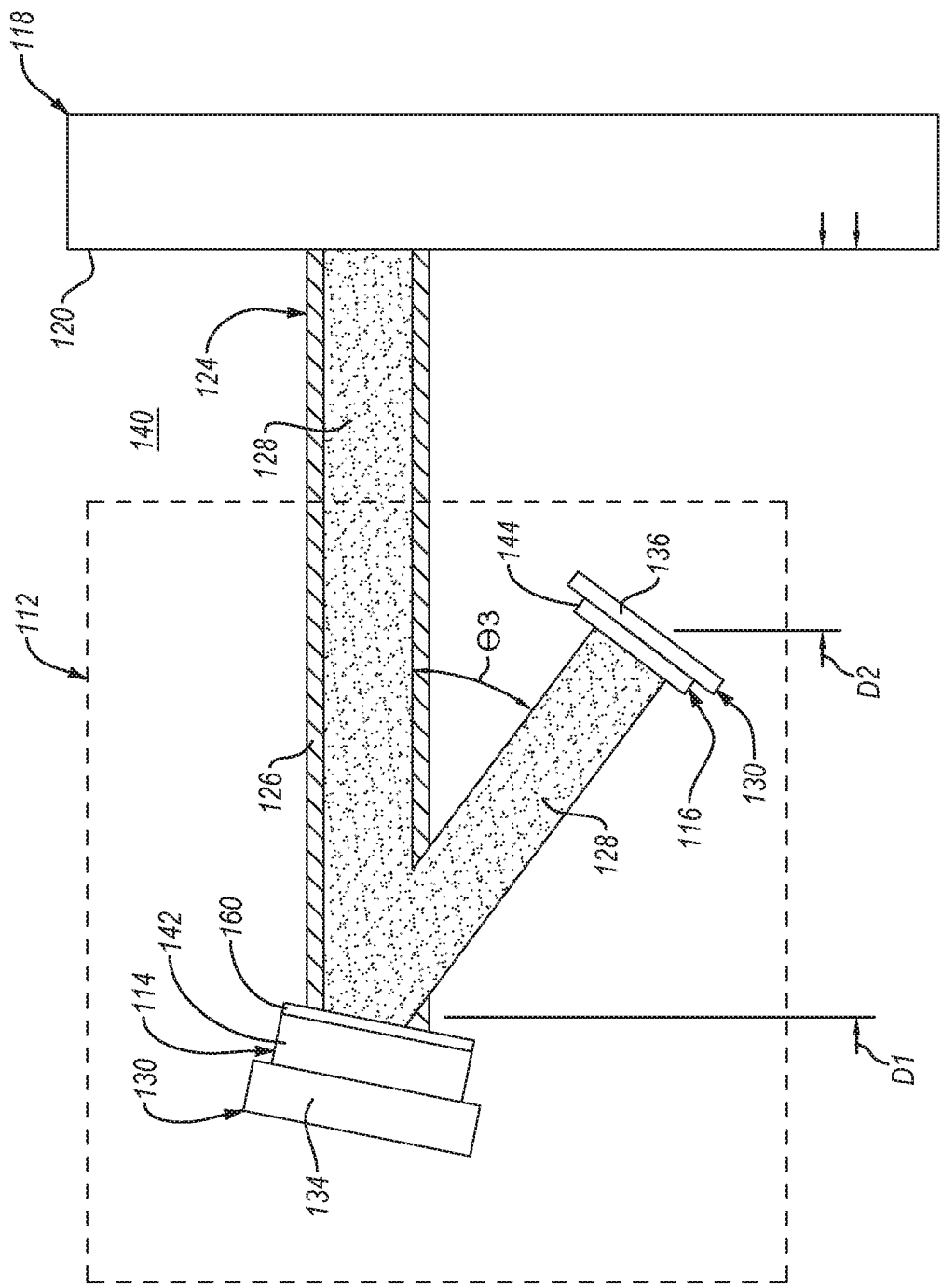
FIG. 8 is a side view of the NDI apparatus of FIG. 1, according to one or more examples of the present disclosure.

According to an additional example, as shown in FIG. 8, the modulated-frequency ultrasonic source 112 generates the modulated-frequency ultrasonic beam 124 concurrently with the emission of the low-frequency ultrasonic beam 126. Moreover, the example of the modulated-frequency ultrasonic source 112 of FIG. 8 utilizes the high-frequency ultrasonic beam 128, emitted by a high-frequency ultrasonic source 116, to activate the low-frequency ultrasonic source 114 and emit the low-frequency ultrasonic beam 126. In other words, instead of directly activating the low-frequency ultrasonic source 114 with the electrical power source 122, the low-frequency ultrasonic source 114 is activated by the high-frequency ultrasonic source 116 impacting the low-frequency ultrasonic source 114 and vibrating the piezoelectric elements of the low-frequency ultrasonic source 114. To facilitate reflection off of the low-frequency ultrasonic source 114 after impact, the low-frequency ultrasonic source 114 further includes an ultrasonically reflective coating 160. In some implementations, the ultrasonically reflective coating 160 is made from the same material as the ultrasonically reflective surfaces 132 described above.

In order to impact the low-frequency ultrasonic source 114 with the high-frequency ultrasonic beam 128, the high-frequency ultrasonic source 116 is located closer to the surface 120 of the structure 118, during inspection, and oriented away from the surface 120 toward the low-frequency ultrasonic source 114. The high-frequency ultrasonic source 116 is located relative to the low-frequency ultrasonic source 114 so that interference between the high-frequency ultrasonic beam 128 emitted from the high-frequency ultrasonic source 116 and the high-frequency ultrasonic beam

128 reflected off of the ultrasonically reflective coating 160 on the low-frequency ultrasonic source 114 is minimized. Accordingly, an angle θ3 between the emitted portion of the high-frequency ultrasonic beam 128 and the reflected portion of the high-frequency ultrasonic beam 128 is selected that helps reduce interference between the two portions and limit energy losses from the high-frequency ultrasonic beam 128. In some implementations, the angle θ3 is between 20 and 40, inclusively. According to some implementations of the example of FIG. 8, the modulated-frequency ultrasonic source 112 further includes a vibration damper 130 coupled to the high-frequency ultrasonic source 116 and a vibration damper 130 coupled to the low-frequency ultrasonic source 114 on surfaces opposite the beam-emitting faces of the high-frequency ultrasonic source 116 and the low-frequency ultrasonic source 114.

Because the modulated-frequency ultrasonic source 112 of FIG. 8 generates the modulated-frequency ultrasonic beam 124 concurrently with the emission of the low-frequency ultrasonic beam 126, the high-frequency ultrasonic beam 128 is carried by the low-frequency ultrasonic beam 126 a longer distance compared to those examples where convergence occurs closer to the surface 120 of the structure 118. Accordingly, the example of FIG. 8 can facilitate the use of air as the ultrasonic transmission medium 140.

Figure 9:
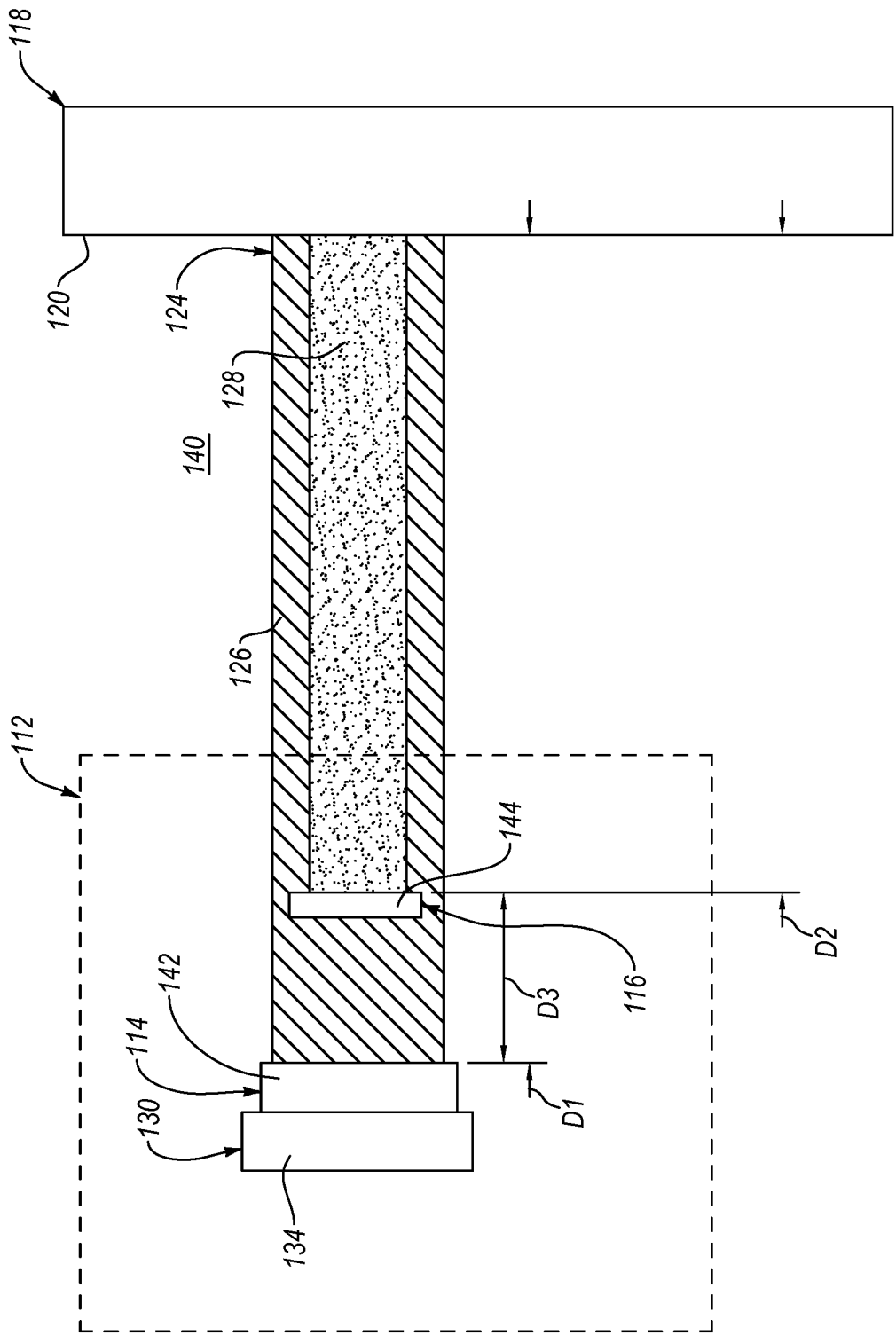
FIG. 9 is a side view of the NDI apparatus of FIG. 1, according to one or more examples of the present disclosure.

According to another example, as shown in FIG. 9, the modulated-frequency ultrasonic source 112 generates the modulated-frequency ultrasonic beam 124 concurrently with the emission of the high-frequency ultrasonic beam 128. Moreover, the example of the modulated-frequency ultrasonic source 112 of FIG. 9 utilizes the low-frequency ultrasonic beam 126, emitted by a low-frequency ultrasonic source 114, to activate the high-frequency ultrasonic source 116 and emit the high-frequency ultrasonic beam 128. In other words, instead of directly activating the high-frequency ultrasonic source 116 with the electrical power source 122, the high-frequency ultrasonic source 116 is activated by the low-frequency ultrasonic source 114 impacting the high-frequency ultrasonic source 116 and vibrating the piezoelectric elements of the high-frequency ultrasonic source 116. This is accomplished by positioning the high-frequency ultrasonic source 116 within the path designated for the low-frequency ultrasonic beam 126.

To help promote transmission of the low-frequency ultrasonic beam 126 through the high-frequency ultrasonic source 116, so as to minimize losses to the low-frequency ultrasonic beam 126, a distance D3 between the low-frequency ultrasonic source 114 and the high-frequency ultrasonic source 116 can be optimized for best impedance matching between the ultrasonic transmission medium 140 and the high-frequency ultrasonic source 116.

Because the modulated-frequency ultrasonic source 112 of FIG. 9 generates the modulated-frequency ultrasonic beam 124 concurrently with the emission of the high-frequency ultrasonic beam 128, the high-frequency ultrasonic beam 128 is carried by the low-frequency ultrasonic beam 126 a longer distance compared to those examples where convergence occurs closer to the surface 120 of the structure 118. Accordingly, the example of FIG. 9 can facilitate the use of air as the ultrasonic transmission medium 140.

Figure 10:
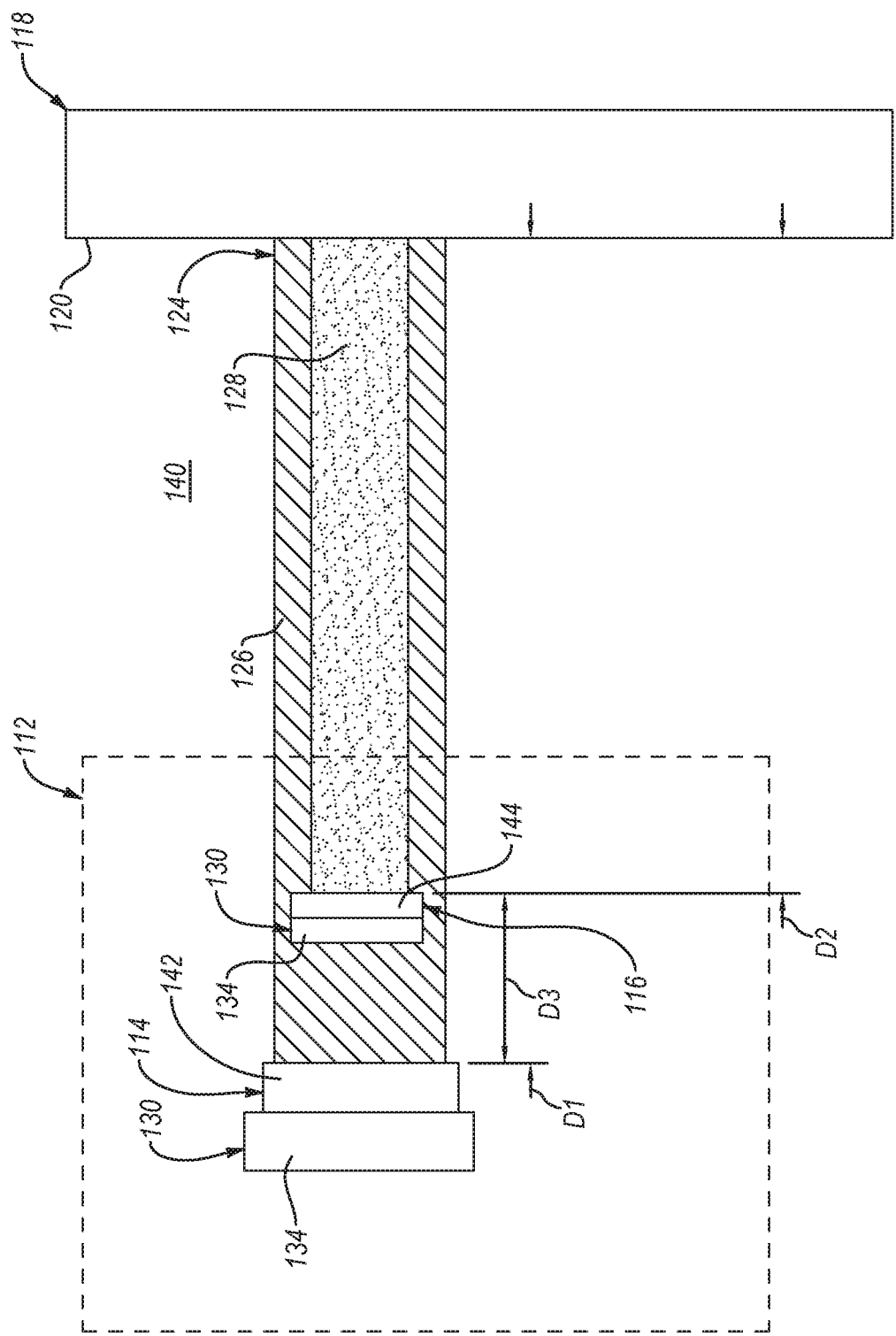
FIG. 10 is a side view of the NDI apparatus of FIG. 1, according to one or more examples of the present disclosure.

Referring to FIG. 10, according to another example of the modulated-frequency ultrasonic source 112, similar to the example of FIG. 9, the high-frequency ultrasonic source 116 is positioned within the path designated for the low-frequency ultrasonic beam 126. Accordingly, the modulated-frequency ultrasonic source 112 of FIG. 10 generates the modulated-frequency ultrasonic beam 124 concurrently with the emission of the high-frequency ultrasonic beam 128. However, unlike the example of FIG. 9, the high-frequency ultrasonic source 116 is directly activated by the electrical power source 122, instead of by the low-frequency ultrasonic beam 126. A vibration damper 130 is positioned between the high-frequency ultrasonic source 116 and the low-frequency ultrasonic source 114 such that the low-frequency ultrasonic beam 126 does not impact or travel through the high-frequency ultrasonic source 116, but transmits around the high-frequency ultrasonic source 116.

To help promote transmission of the low-frequency ultrasonic beam 126 around the high-frequency ultrasonic source 116, a distance D3 between the low-frequency ultrasonic source 114 and the high-frequency ultrasonic source 116 can be optimized. Additionally, to promote transmission of the low-frequency ultrasonic beam 126 around the high-frequency ultrasonic source 116, the size of the high-frequency ultrasonic source 116 can be reduced compared to that of the example of FIG. 9.

Because the modulated-frequency ultrasonic source 112 of FIG. 10 generates the modulated-frequency ultrasonic beam 124 concurrently with the emission of the high-frequency ultrasonic beam 128, the high-frequency ultrasonic beam 128 is carried by the low-frequency ultrasonic beam 126 a longer distance compared to those examples where convergence occurs closer to the surface 120 of the structure 118. Accordingly, the example of FIG. 10 can facilitate the use of air as the ultrasonic transmission medium 140.

Figure 11:
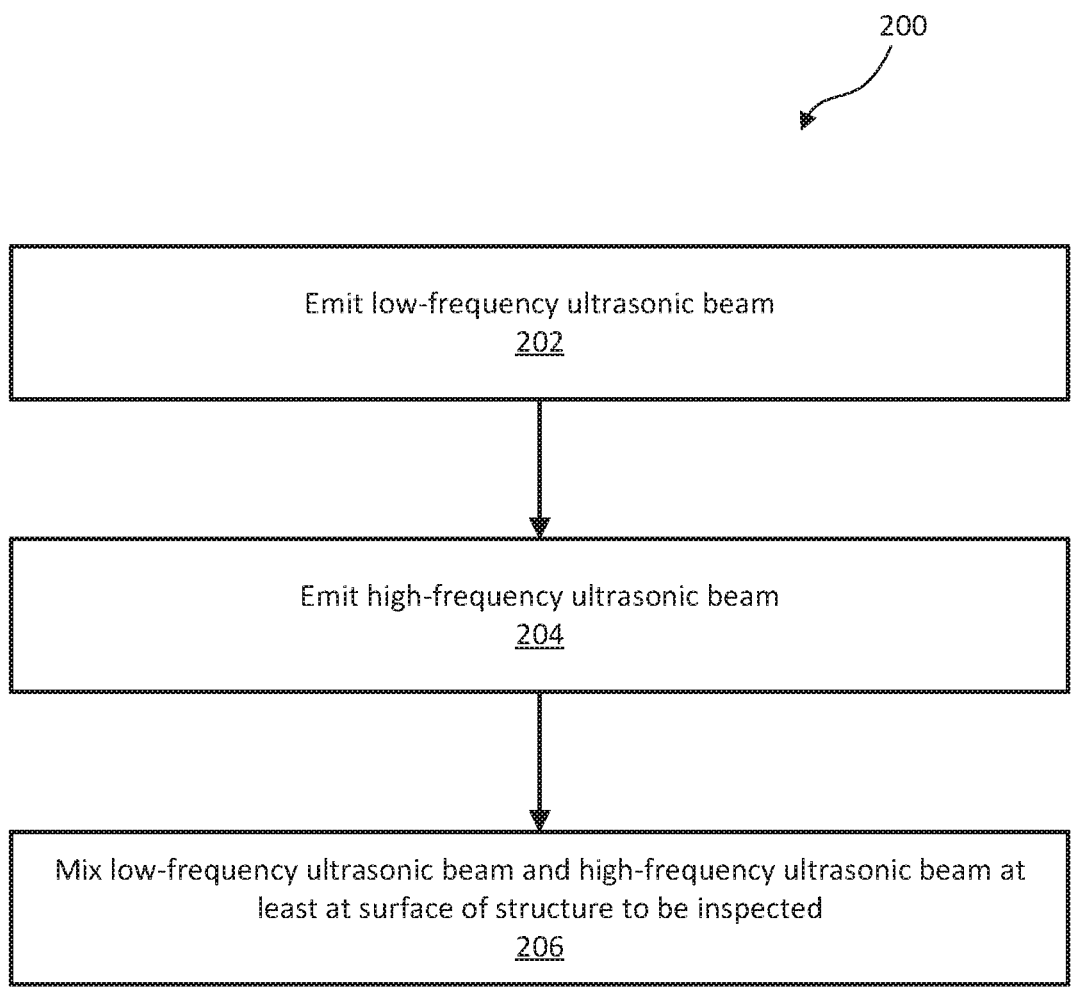
FIG. 11 is a schematic flow diagram of a method of inspecting a structure using the NDI apparatus of FIG. 1, according to one or more examples of the present disclosure.

Referring to FIG. 11, according to one example, a method 200 of inspecting a structure 118 using the NDI apparatus 100 is disclosed. The method 200 includes (block 202) emitting a low-frequency ultrasonic beam 126, such as from a low-frequency ultrasonic source 114. The method 200 also includes (block 204) emitting a high-frequency ultrasonic beam 128, such as from a high-frequency ultrasonic source 116. The method 200 additionally includes (block 206) mixing the low-frequency ultrasonic beam 126 and the high-frequency ultrasonic beam 128 at least at a surface 120 of the structure 118 to be inspected.

Within examples, mixing the low-frequency ultrasonic beam 126 and the high-frequency ultrasonic beam 128 at least at a surface 120 of the structure 118 to be inspected involves at least one ultrasonically reflective surface 132, positioned relative to one of the low-frequency ultrasonic source 114 or the high-frequency ultrasonic source 116, receiving and redirecting one of the low-frequency ultrasonic beam 126 or the high-frequency ultrasonic beam 128 to mix with another one of the low-frequency ultrasonic beam 126 or the high-frequency ultrasonic beam 128 at least at the surface 120 of the structure 118 to be inspected.

Within examples, mixing the low-frequency ultrasonic beam 126 and the high-frequency ultrasonic beam 128 at least at a surface 120 of the structure 118 to be inspected involves (i) a first ultrasonically reflective surface 132 positioned relative to the low-frequency ultrasonic source 114 receiving and redirecting the low-frequency ultrasonic beam 126 to mix with the high-frequency ultrasonic beam 128 and (ii) a second ultrasonically reflective surface 132 positioned relative to the high-frequency ultrasonic source 116 receiving and redirecting the high-frequency ultrasonic beam 128 to mix with the low-frequency ultrasonic beam 126.

Within examples, method 200 further involves an ultrasonic receiver system 150 detecting ultrasonic waves having the second frequency associated with the high-frequency ultrasonic beam 128 and reflected from the structure 118.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A non-destructive inspection (NDI) apparatus, comprising:
    a main body; and
    a modulated-frequency ultrasonic source, coupled to the main body and comprising:
        a low-frequency ultrasonic source, selectively operable to emit a low-frequency ultrasonic beam having a first frequency; and
        a high-frequency ultrasonic source, selectively operable to emit a high-frequency ultrasonic beam having a second frequency higher than the first frequency;
    wherein:
        the modulated-frequency ultrasonic source is configured to mix the low-frequency ultrasonic beam and the high-frequency ultrasonic beam at least at a surface of a structure to be inspected; and
        the modulated-frequency ultrasonic source further comprises at least one ultrasonically reflective surface, positioned relative to one of the low-frequency ultrasonic source or the high-frequency ultrasonic source, to receive and redirect one of the low-frequency ultrasonic beam or the high-frequency ultrasonic beam to mix with the other one of the low-frequency ultrasonic beam or the high-frequency ultrasonic beam at least at the surface of the structure to be inspected.

2. The NDI apparatus according to claim 1, wherein each one of the low-frequency ultrasonic source and the high-frequency ultrasonic source comprises a piezoelectric material.

3. The NDI apparatus according to claim 1, wherein:
the modulated-frequency ultrasonic source further comprises a plurality of ultrasonically reflective surfaces;
a first one of the plurality of ultrasonically reflective surfaces is positioned relative to the low-frequency ultrasonic source to receive and redirect the low-frequency ultrasonic beam to mix with the high-frequency ultrasonic beam; and
a second one of the plurality of ultrasonically reflective surfaces is positioned relative to the high-frequency ultrasonic source to receive and redirect the high-frequency ultrasonic beam to mix with the low-frequency ultrasonic beam.

4. The NDI apparatus according to claim 3, wherein the modulated-frequency ultrasonic source further comprises a vibration damper interposed between the low-frequency ultrasonic source and the high-frequency ultrasonic source, wherein the low-frequency ultrasonic source and the high-frequency ultrasonic source are arranged in a back-to-back configuration such that the low-frequency ultrasonic source emits the low-frequency ultrasonic beam in a first direction and the high-frequency ultrasonic source emits the high-frequency ultrasonic beam in a second direction opposite the first direction.

5. The NDI apparatus according to claim 4, wherein:
the vibration damper comprises a first damping material and a second damping material;
the first damping material is interposed between the low-frequency ultrasonic source and the second damping material;
the second damping material is interposed between the first damping material and the high-frequency ultrasonic source; and
a damping coefficient of the first damping material is lower than a damping coefficient of the second damping material.

6. The NDI apparatus according to claim 1, wherein the low-frequency ultrasonic source and the high-frequency ultrasonic source are arranged in a side-by-side configuration such that the low-frequency ultrasonic source emits the low-frequency ultrasonic beam at a first distance away from the surface of the structure and the high-frequency ultrasonic source emits the high-frequency ultrasonic beam at the first distance away from the surface of the structure.

7. The NDI apparatus according to claim 6, wherein:
the at least one ultrasonically reflective surface receives and redirects both the low-frequency ultrasonic beam and the high-frequency ultrasonic beam to mix the low-frequency ultrasonic beam and the high-frequency ultrasonic beam;
the low-frequency ultrasonic source emits the low-frequency ultrasonic beam in a first direction; and
the high-frequency ultrasonic source emits the high-frequency ultrasonic beam in a second direction different than the first direction.

8. The NDI apparatus according to claim 6, wherein:
the modulated-frequency ultrasonic source further comprises a plurality of ultrasonically reflective surfaces;
a first one of the plurality of ultrasonically reflective surfaces receives and redirects the low-frequency ultrasonic beam to mix with the high-frequency ultrasonic beam;
a second one of the plurality of ultrasonically reflective surfaces receives and redirects the high-frequency ultrasonic beam to mix with the low-frequency ultrasonic beam;

the low-frequency ultrasonic source emits the low-frequency ultrasonic beam in a first direction;
the high-frequency ultrasonic source emits the high-frequency ultrasonic beam in the first direction; and
the first one of the plurality of ultrasonically reflective surfaces is angled relative to the second one of the plurality of ultrasonically reflective surfaces.

9. The NDI apparatus according to claim 6, wherein:
the modulated-frequency ultrasonic source further comprises a plurality of ultrasonically reflective surfaces;
the low-frequency ultrasonic source emits the low-frequency ultrasonic beam in a first direction and emits a second low-frequency ultrasonic beam in a second direction opposite the first direction;
the high-frequency ultrasonic source emits the high-frequency ultrasonic beam in the first direction and emits a second high-frequency ultrasonic beam in the second direction;
a first one of the plurality of ultrasonically reflective surfaces receives and redirects both the low-frequency ultrasonic beam and the high-frequency ultrasonic beam to mix the low-frequency ultrasonic beam, the high-frequency ultrasonic beam, the second low-frequency ultrasonic beam, and the second high-frequency ultrasonic beam at least at the surface of the structure to be inspected; and
a second one of the plurality of ultrasonically reflective surfaces receives and redirects both the second low-frequency ultrasonic beam and the second high-frequency ultrasonic beam to mix the second low-frequency ultrasonic beam, the second high-frequency ultrasonic beam, the low-frequency ultrasonic beam, and the high-frequency ultrasonic beam at least at the surface of the structure to be inspected.

10. The NDI apparatus according to claim 1, wherein:
the low-frequency ultrasonic source and the high-frequency ultrasonic source are arranged in a front-to-back configuration such that the low-frequency ultrasonic source emits the low-frequency ultrasonic beam at a first distance away from the surface of the structure and the high-frequency ultrasonic source emits the high-frequency ultrasonic beam at a second distance away from the surface of the structure; and
the first distance is greater than the second distance.

11. The NDI apparatus according to claim 10, wherein:
the modulated-frequency ultrasonic source further comprises a plurality of ultrasonically reflective surfaces;
a first one of the plurality of ultrasonically reflective surfaces receives and redirects the low-frequency ultrasonic beam to mix the low-frequency ultrasonic beam and the high-frequency ultrasonic beam;
a second one of the plurality of ultrasonically reflective surfaces receives and redirects the high-frequency ultrasonic beam to mix the high-frequency ultrasonic beam and the low-frequency ultrasonic beam;
the low-frequency ultrasonic source emits the low-frequency ultrasonic beam in a first direction; and
the high-frequency ultrasonic source emits the high-frequency ultrasonic beam in a second direction opposite the first direction.

12. The NDI apparatus according to claim 10, wherein:
the modulated-frequency ultrasonic source further comprises a plurality of ultrasonically reflective surfaces;
the low-frequency ultrasonic source emits the low-frequency ultrasonic beam in a first direction and emits a second low-frequency ultrasonic beam in a second direction opposite the first direction;

the high-frequency ultrasonic source emits the high-frequency ultrasonic beam in the first direction and emits a second high-frequency ultrasonic beam in the second direction;
a first one of the plurality of ultrasonically reflective surfaces receives and redirects the low-frequency ultrasonic beam to mix the low-frequency ultrasonic beam, the high-frequency ultrasonic beam, the second low-frequency ultrasonic beam, and the second high-frequency ultrasonic beam at least at the surface of the structure to be inspected;
a second one of the plurality of ultrasonically reflective surfaces receives and redirects the second low-frequency ultrasonic beam to mix the second low-frequency ultrasonic beam, the high-frequency ultrasonic beam, the low-frequency ultrasonic beam, and the second high-frequency ultrasonic beam at least at the surface of the structure to be inspected;
a third one of the plurality of ultrasonically reflective surfaces receives and redirects the high-frequency ultrasonic beam to mix the high-frequency ultrasonic beam, the low-frequency ultrasonic beam, the second low-frequency ultrasonic beam, and the second high-frequency ultrasonic beam at least at the surface of the structure to be inspected; and
a fourth one of the plurality of ultrasonically reflective surfaces receives and redirects the second high-frequency ultrasonic beam to mix the second high-frequency ultrasonic beam, the low-frequency ultrasonic beam, the second low-frequency ultrasonic beam, and the second high-frequency ultrasonic beam at least at the surface of the structure to be inspected.

13. The NDI apparatus according to claim 1, wherein:
the modulated-frequency ultrasonic source further comprises:
  a vibration damper;
  a plurality of ultrasonically reflective surfaces;
  a plurality of low-frequency ultrasonic sources; and
  a plurality of high-frequency ultrasonic sources
a first one of the plurality of low-frequency ultrasonic sources is selectively operable to emit the low-frequency ultrasonic beam in a first direction;
a second one of the plurality of low-frequency ultrasonic sources is selectively operable to emit a second low-frequency ultrasonic beam in a second direction different than the first direction;
a first one of the plurality of high-frequency ultrasonic sources is selectively operable to emit the high-frequency ultrasonic beam in a third direction different than the first direction and the second direction;
a second one of the plurality of high-frequency ultrasonic sources is selectively operable to emit a second high-frequency ultrasonic beam in a fourth direction different than the first direction, the second direction, and the third direction;
the vibration damper is interposed between the first one and the second one of the plurality of low-frequency ultrasonic sources and interposed between the first one and the second one of the plurality of high-frequency ultrasonic sources; and
each one of the plurality of ultrasonically reflective surfaces is positioned to receive and redirect a corresponding one of the low-frequency ultrasonic beam, the second low-frequency ultrasonic beam, the high-frequency ultrasonic beam, and the second high-frequency ultrasonic beam to mix the low-frequency ultrasonic beam, the second low-frequency ultrasonic beam, the high-frequency ultrasonic beam, and the second high-frequency ultrasonic beam at least at the surface of the structure to be inspected.

14. The NDI apparatus according to claim 13, wherein:
the first direction is opposite the second direction;
the third direction is opposite the fourth direction; and
the first direction is perpendicular to the third direction.

15. The NDI apparatus according to claim 1, wherein:
the modulated-frequency ultrasonic source further comprises:
  a vibration damper;
  a plurality of ultrasonically reflective surfaces; and
  a plurality of high-frequency ultrasonic sources;
the low-frequency ultrasonic source is selectively operable to emit the low-frequency ultrasonic beam in a first direction;
a first one of the plurality of high-frequency ultrasonic sources is selectively operable to emit the high-frequency ultrasonic beam in a second direction different than the first direction;
a second one of the plurality of high-frequency ultrasonic sources is selectively operable to emit a second high-frequency ultrasonic beam in a third direction different than the first direction and the second direction;
a third one of the plurality of high-frequency ultrasonic sources is selectively operable to emit a third high-frequency ultrasonic beam in a fourth direction different than the first direction, the second direction, and the third direction;
the vibration damper is interposed between the low-frequency ultrasonic source and the first one of the plurality of high-frequency ultrasonic sources and interposed between the second one and the third one of the plurality of high-frequency ultrasonic sources;
each one of the plurality of ultrasonically reflective surfaces is positioned to receive and redirect a corresponding one of the low-frequency ultrasonic beam, the high-frequency ultrasonic beam, the second high-frequency ultrasonic beam, and the third high-frequency ultrasonic beam to mix the low-frequency ultrasonic beam, the high-frequency ultrasonic beam, the second high-frequency ultrasonic beam, and the third high-frequency ultrasonic beam at least at the surface of the structure to be inspected; and
the modulated-frequency ultrasonic source has more high-frequency ultrasonic sources than low-frequency ultrasonic sources.

16. The NDI apparatus according to claim 1, wherein:
the modulated-frequency ultrasonic source further comprises:
  a first vibration damper coupled to the low-frequency ultrasonic source, wherein the at least one a ultrasonically reflective surface is applied to the low-frequency ultrasonic source such that the low-frequency ultrasonic source is interposed between the first vibration damper and the ultrasonically reflective surface; and
  a second vibration damper coupled to the high-frequency ultrasonic source; and
the high-frequency ultrasonic source is arranged, relative to the low-frequency ultrasonic source, to emit the high-frequency ultrasonic beam toward the low-frequency ultrasonic source such that the high-frequency ultrasonic beam induces the low-frequency ultrasonic source to emit the low-frequency ultrasonic beam.

17. The NDI apparatus according to claim 1, further comprising an ultrasonic receiver system comprising at least one ultrasonic receiver tuned to detect ultrasonic waves reflected from the structure and having the second frequency.

18. A non-destructive inspection (NDI) apparatus, comprising:
a main body; and
a modulated-frequency ultrasonic source, coupled to the main body and comprising:
a low-frequency ultrasonic source, selectively operable to emit a low-frequency ultrasonic beam having a first frequency; and
a high-frequency ultrasonic source, selectively operable to emit a high-frequency ultrasonic beam having a second frequency higher than the first frequency;
wherein:
the modulated-frequency ultrasonic source is configured to mix the low-frequency ultrasonic beam and the high-frequency ultrasonic beam at least at a surface of a structure to be inspected;
the high-frequency ultrasonic source is positioned to receive the low-frequency ultrasonic beam; and
the low-frequency ultrasonic beam induces the high-frequency ultrasonic source to emit the high-frequency ultrasonic beam.

19. A non-destructive inspection (NDI) apparatus, comprising:
a main body; and
a modulated-frequency ultrasonic source, coupled to the main body and comprising:
a low-frequency ultrasonic source, selectively operable to emit a low-frequency ultrasonic beam having a first frequency; and
a high-frequency ultrasonic source, selectively operable to emit a high-frequency ultrasonic beam having a second frequency higher than the first frequency;
wherein:
the modulated-frequency ultrasonic source is configured to mix the low-frequency ultrasonic beam and the high-frequency ultrasonic beam at least at a surface of a structure to be inspected;
the modulated-frequency ultrasonic source further comprises a vibration damper coupled to the high-frequency ultrasonic source and interposed between the high-frequency ultrasonic source and the low-frequency ultrasonic source; and
the high-frequency ultrasonic source is positioned to be within the low-frequency ultrasonic beam.

20. A non-destructive inspection (NDI) apparatus, comprising:
a main body; and
a modulated-frequency ultrasonic source, coupled to the main body and comprising:
a low-frequency ultrasonic source, selectively operable to emit a low-frequency ultrasonic beam having a first frequency;
a high-frequency ultrasonic source, selectively operable to emit a high-frequency ultrasonic beam having a second frequency higher than the first frequency; and
at least two ultrasonically reflective surfaces, each positioned relative to a corresponding one of the low-frequency ultrasonic source and the high-frequency ultrasonic source, to receive and redirect a corresponding one of the low-frequency ultrasonic beam and the high-frequency ultrasonic beam to mix with the other one of the low-frequency ultrasonic beam and the high-frequency ultrasonic beam at least at the surface of the structure to be inspected.

21. The NDI apparatus according to claim 20, wherein the modulated-frequency ultrasonic source further comprises a vibration damper interposed between the low-frequency ultrasonic source and the high-frequency ultrasonic source, wherein the low-frequency ultrasonic source and the high-frequency ultrasonic source are arranged in a back-to-back configuration such that the low-frequency ultrasonic source emits the low-frequency ultrasonic beam in a first direction and the high-frequency ultrasonic source emits the high-frequency ultrasonic beam in a second direction opposite the first direction.

22. The NDI apparatus according to claim 20, wherein the low-frequency ultrasonic source and the high-frequency ultrasonic source are arranged in a side-by-side configuration such that the low-frequency ultrasonic source emits the low-frequency ultrasonic beam at a first distance away from the surface of the structure and the high-frequency ultrasonic source emits the high-frequency ultrasonic beam at the first distance away from the surface of the structure.

23. A method of inspecting a structure, the method comprising:
emitting a low-frequency ultrasonic beam, having a first frequency, from a low-frequency ultrasonic source;
emitting a high-frequency ultrasonic beam, having a second frequency higher than the first frequency, from a high-frequency ultrasonic source;
mixing the low-frequency ultrasonic beam and the high-frequency ultrasonic beam at least at a surface of the structure to be inspected;
receiving, at at least one ultrasonically reflective surface, and redirecting, from the at least one ultrasonically reflective surface, one of the low-frequency ultrasonic beam or the high-frequency ultrasonic beam to mix with the other one of the low-frequency ultrasonic beam or the high-frequency ultrasonic beam at least at the surface of the structure to be inspected.

24. The method according to 23, wherein receiving, at the at least one ultrasonically reflective surface, and redirecting, from the at least one ultrasonically reflective surface, one of the low-frequency ultrasonic beam or the high-frequency ultrasonic beam to mix with the other one of the low-frequency ultrasonic beam or the high-frequency ultrasonic beam at least at the surface of the structure to be inspected comprises:
receiving, at a first ultrasonically reflective surface, and redirecting, from the first ultrasonically reflective surface, the low-frequency ultrasonic beam to mix with the high-frequency ultrasonic beam at least at the surface of the structure to be inspected; and
receiving, at a second ultrasonically reflective surface, and redirecting, from the second ultrasonically reflective surface, the high-frequency ultrasonic beam to mix with the low-frequency ultrasonic beam at least at the surface of the structure to be inspected.

25. The method according to claim 23, further comprising detecting, using at least one ultrasonic receiver, ultrasonic waves that have the second frequency and are reflected from the structure.

* * * * *